US012587320B2

(12) United States Patent
Narula et al.

(10) Patent No.: US 12,587,320 B2
(45) Date of Patent: Mar. 24, 2026

(54) DISTANCE-BASED NACK PROCEDURES IN A VEHICULAR PLATOON

(71) Applicant: QUALCOMM INCORPORATED, San Diego, CA (US)

(72) Inventors: Mohit Narula, San Diego, CA (US); Kapil Gulati, Belle Mead, NJ (US); Hui Guo, Beijing (CN)

(73) Assignee: QUALCOMM Incorporated, San Diego, CA (US)

( * ) Notice: Subject to any disclaimer, the term of this patent is extended or adjusted under 35 U.S.C. 154(b) by 72 days.

(21) Appl. No.: 18/561,237

(22) PCT Filed: Jul. 21, 2021

(86) PCT No.: PCT/CN2021/107518
§ 371 (c)(1),
(2) Date: Nov. 15, 2023

(87) PCT Pub. No.: WO2023/000191
PCT Pub. Date: Jan. 26, 2023

(65) Prior Publication Data
US 2024/0259142 A1 Aug. 1, 2024

(51) Int. Cl.
*H04L 1/1829* (2023.01)
*H04L 1/1867* (2023.01)
*H04L 5/00* (2006.01)

(52) U.S. Cl.
CPC .......... *H04L 1/1854* (2013.01); *H04L 1/1864* (2013.01); *H04L 1/1896* (2013.01); *H04L 5/0055* (2013.01)

(58) Field of Classification Search
CPC ... H04L 1/1854; H04L 1/1864; H04L 1/1896; H04L 5/0055

(Continued)

(56) References Cited

U.S. PATENT DOCUMENTS

| | | | | |
|---|---|---|---|---|
| 2018/0359072 A1* | 12/2018 | Tiirola | ............... | H04L 1/1854 |
| 2020/0389257 A1* | 12/2020 | Kung | ..................... | H04W 4/06 |
| 2021/0211238 A1* | 7/2021 | Kung | .................... | H04B 17/24 |

FOREIGN PATENT DOCUMENTS

| | | | |
|---|---|---|---|
| CN | 111226408 | * | 6/2020 |
| WO | WO-2017-016889 | * | 2/2017 |
| WO | WO-2020144943 A1 | | 7/2020 |

OTHER PUBLICATIONS

Interdigital Inc: On Physical Layer Procedures, 3GPP Draft, R1-1813227, 3rd Generation Partnership Project (3GPP), Mobile Competence Centre, 650, Route Des, Lucioles, F-06921 Sophia-Antipolis Cedex, France, Nov. 16, 2018 (Nov. 16, 2018), XP051479514. (Year: 2018).*

(Continued)

*Primary Examiner* — Muhammad Shafi
(74) *Attorney, Agent, or Firm* — QUALCOMM Incorporated

(57) ABSTRACT

Methods, systems, and devices for wireless communications are described. A user equipment (UE), such as a vehicle UE may receive an indication of a change in a formation of a vehicle grouping, such as a platoon, with which the UE is associated, the vehicle grouping including a plurality of vehicles moving as a group based on sidelink communications between members of the group. The UE may determine a distance-based feedback procedure to be used by the UE based on whether the UE is, as a result of the change in the formation, a primary vehicle in the vehicle grouping or a secondary vehicle that is responsive to one or more primary vehicles in the vehicle grouping, and may operate in accordance with the distance-based feedback procedure.

30 Claims, 15 Drawing Sheets

(58) Field of Classification Search
    USPC .......................................................... 701/23
    See application file for complete search history.

(56) References Cited

OTHER PUBLICATIONS

Interdigital Inc: "On Physical Layer Procedures", 3GPP Draft, R1-1813227, 3rd Generation Partnership Project (3GPP), Mobile Competence Centre, 650, Route Des, Lucioles, F-06921 Sophia-Antipolis Cedex, France, Nov. 16, 2018 (Nov. 16, 2018) XP051479514, 5 Pages, Retrieved from the Internet: URL: http://www.3gpp.org/ftp/tsg%5Fran/WG1%5FRL1/TSGR1%5F95/Docs/R1%2D1813227%2Ezip p. 1-p. 3.
International Search Report and Written Opinion—PCT/CN2021/107518—ISA/EPO—Jan. 19, 2022.
OPPO: "Physical Layer Procedure for NR-V2X," 3GPP Draft, 3GPP TSG RAN WG1 Meeting #95, R1-1812811, 3rd Generation Partnership Project (3GPP), Mobile Competence Centre, 650, Route Des Lucioles, F-06921, Sophia-Antipolis Cedex, France, Nov. 12-16, 2018 (Nov. 16, 2018), XP051479056, 5 Pages, Paragraph [02.3]-Paragraph [0003], p. 2.

* cited by examiner

PSFCH 230

SCI 235

610

620

615

605

600

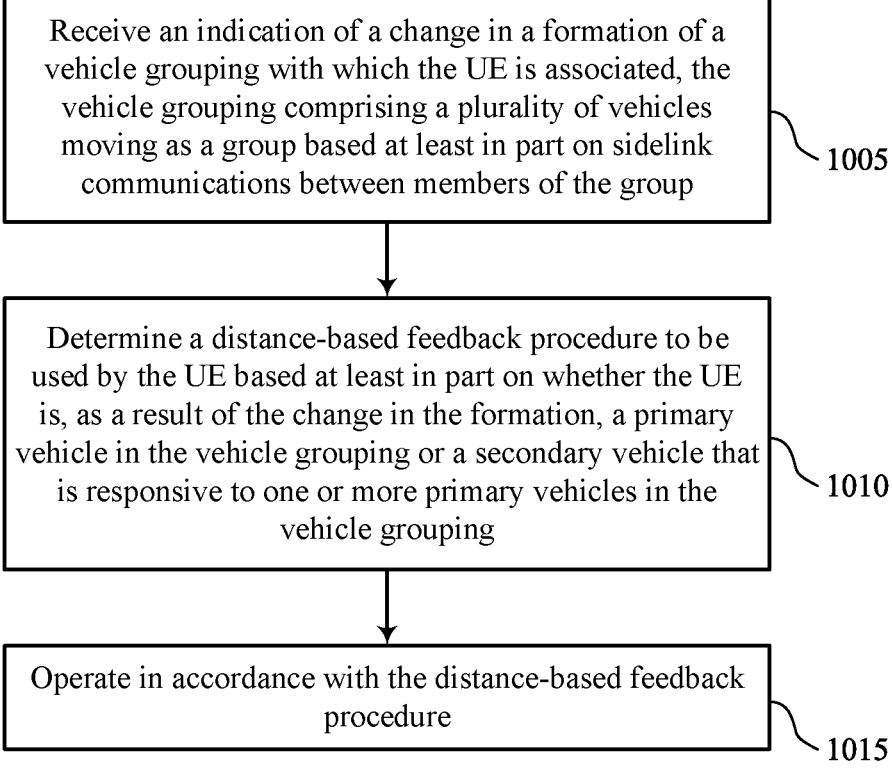

Receive an indication of a change in a formation of a vehicle grouping with which the UE is associated, the vehicle grouping comprising a plurality of vehicles moving as a group based at least in part on sidelink communications between members of the group ⟍ 1005

Determine a distance-based feedback procedure to be used by the UE based at least in part on whether the UE is, as a result of the change in the formation, a primary vehicle in the vehicle grouping or a secondary vehicle that is responsive to one or more primary vehicles in the vehicle grouping ⟍ 1010

Operate in accordance with the distance-based feedback procedure ⟍ 1015

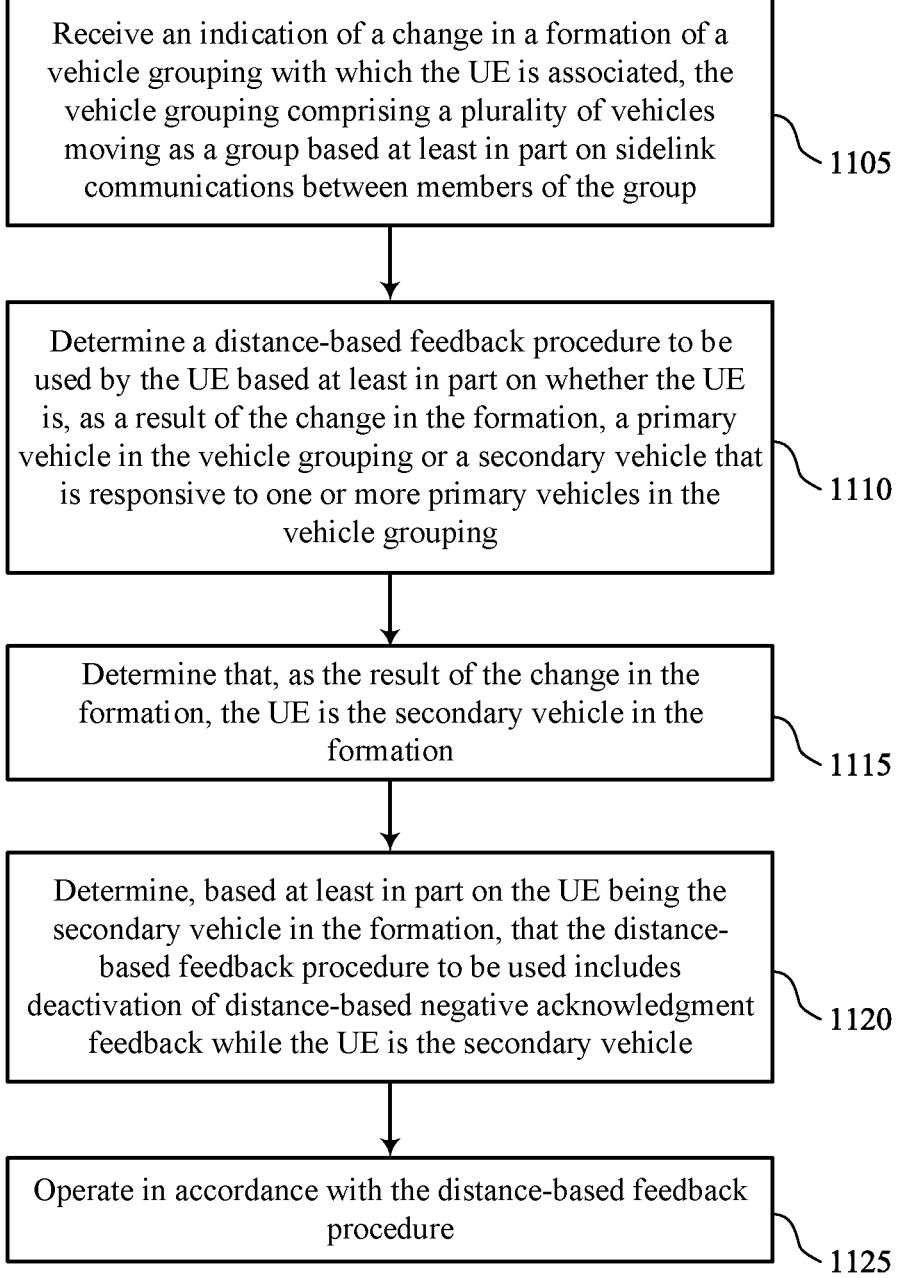

Receive an indication of a change in a formation of a vehicle grouping with which the UE is associated, the vehicle grouping comprising a plurality of vehicles moving as a group based at least in part on sidelink communications between members of the group

1105

Determine a distance-based feedback procedure to be used by the UE based at least in part on whether the UE is, as a result of the change in the formation, a primary vehicle in the vehicle grouping or a secondary vehicle that is responsive to one or more primary vehicles in the vehicle grouping

1110

Determine that, as the result of the change in the formation, the UE is the secondary vehicle in the formation

1115

Determine, based at least in part on the UE being the secondary vehicle in the formation, that the distance-based feedback procedure to be used includes deactivation of distance-based negative acknowledgment feedback while the UE is the secondary vehicle

1120

Operate in accordance with the distance-based feedback procedure

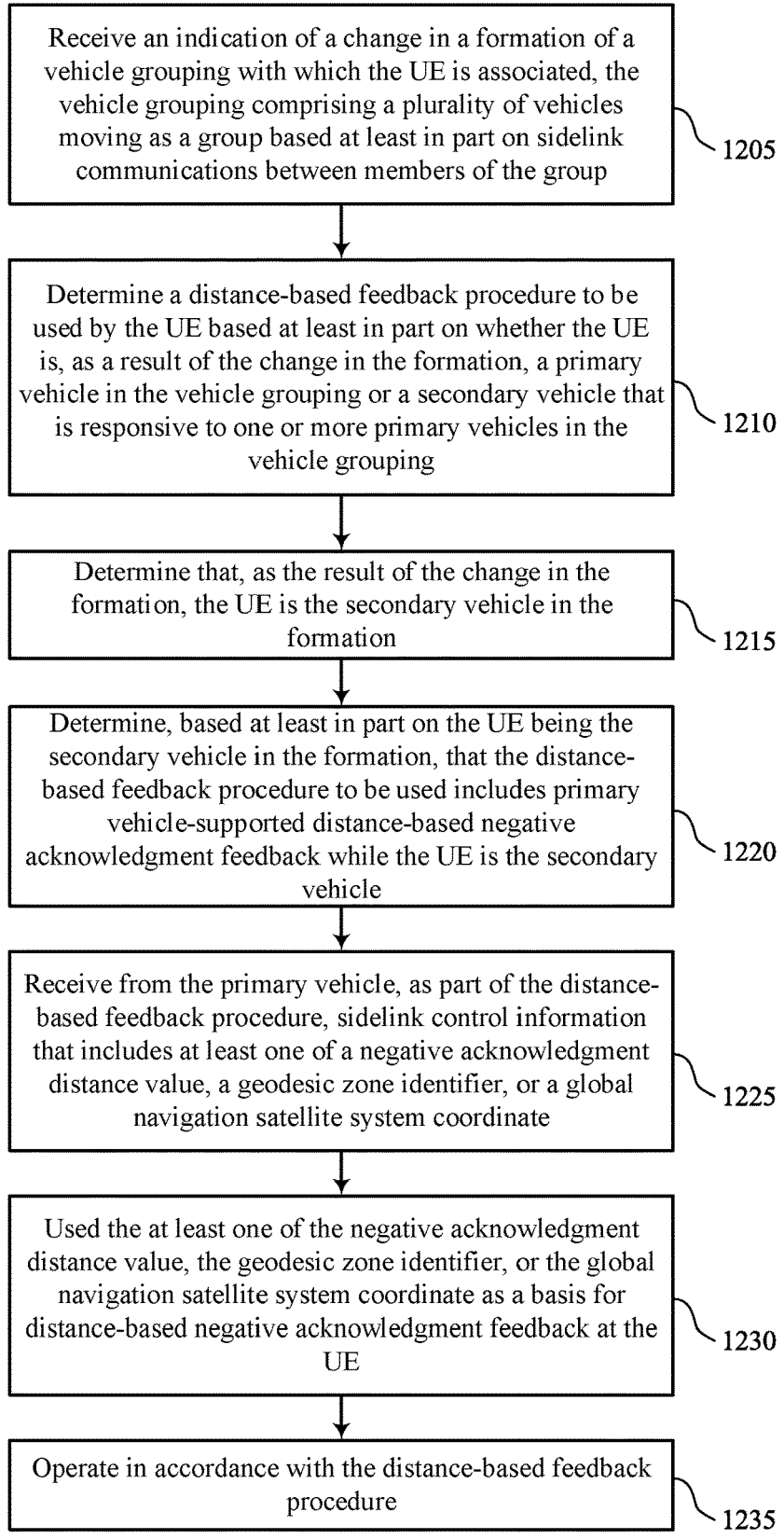

Receive an indication of a change in a formation of a vehicle grouping with which the UE is associated, the vehicle grouping comprising a plurality of vehicles moving as a group based at least in part on sidelink communications between members of the group

1205

Determine a distance-based feedback procedure to be used by the UE based at least in part on whether the UE is, as a result of the change in the formation, a primary vehicle in the vehicle grouping or a secondary vehicle that is responsive to one or more primary vehicles in the vehicle grouping

1210

Determine that, as the result of the change in the formation, the UE is the secondary vehicle in the formation

1215

Determine, based at least in part on the UE being the secondary vehicle in the formation, that the distance-based feedback procedure to be used includes primary vehicle-supported distance-based negative acknowledgment feedback while the UE is the secondary vehicle

1220

Receive from the primary vehicle, as part of the distance-based feedback procedure, sidelink control information that includes at least one of a negative acknowledgment distance value, a geodesic zone identifier, or a global navigation satellite system coordinate

1225

Used the at least one of the negative acknowledgment distance value, the geodesic zone identifier, or the global navigation satellite system coordinate as a basis for distance-based negative acknowledgment feedback at the UE

1230

Operate in accordance with the distance-based feedback procedure

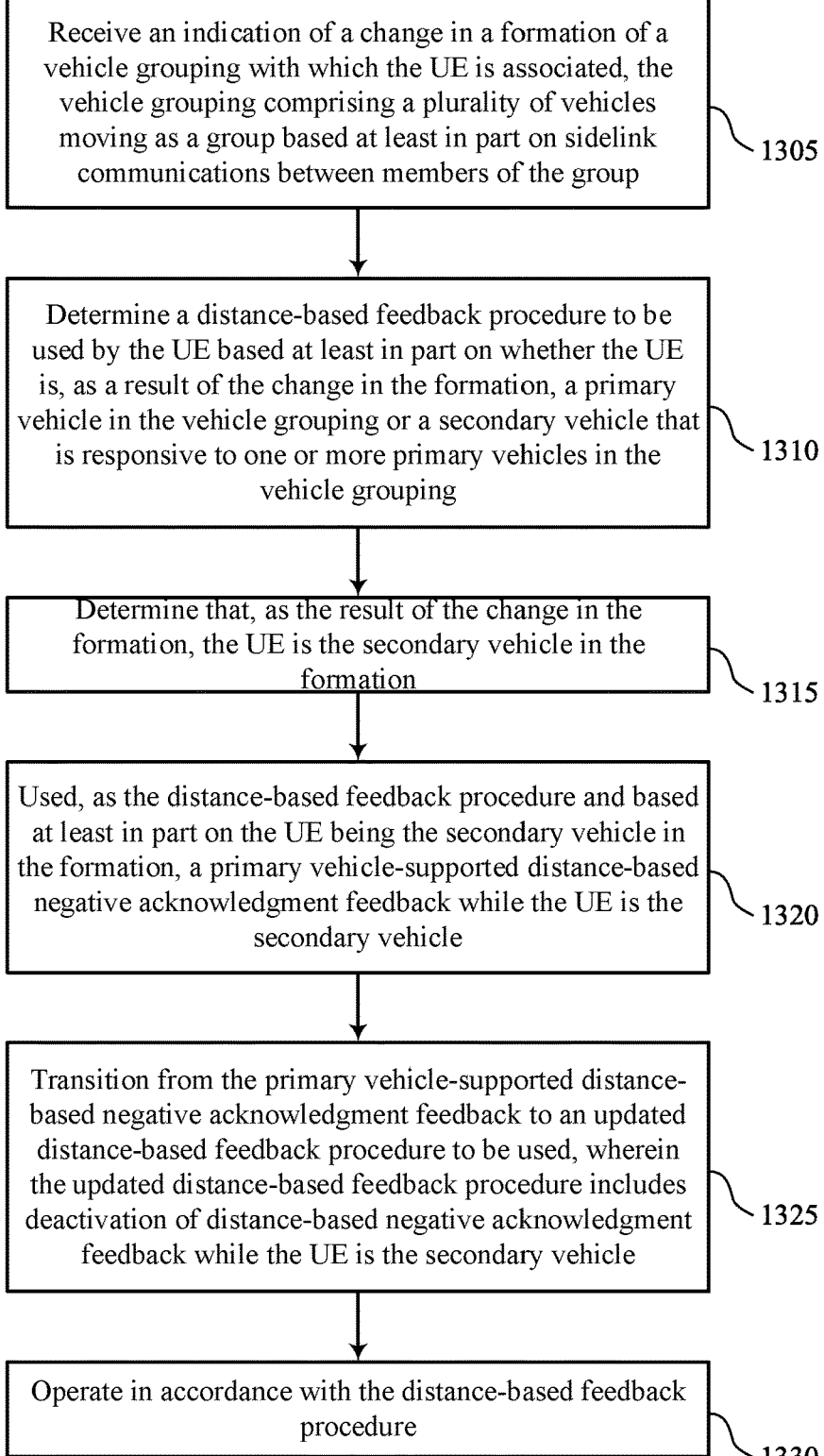

Receive an indication of a change in a formation of a vehicle grouping with which the UE is associated, the vehicle grouping comprising a plurality of vehicles moving as a group based at least in part on sidelink communications between members of the group

1305

Determine a distance-based feedback procedure to be used by the UE based at least in part on whether the UE is, as a result of the change in the formation, a primary vehicle in the vehicle grouping or a secondary vehicle that is responsive to one or more primary vehicles in the vehicle grouping

1310

Determine that, as the result of the change in the formation, the UE is the secondary vehicle in the formation

1315

Used, as the distance-based feedback procedure and based at least in part on the UE being the secondary vehicle in the formation, a primary vehicle-supported distance-based negative acknowledgment feedback while the UE is the secondary vehicle

1320

Transition from the primary vehicle-supported distance-based negative acknowledgment feedback to an updated distance-based feedback procedure to be used, wherein the updated distance-based feedback procedure includes deactivation of distance-based negative acknowledgment feedback while the UE is the secondary vehicle

1325

Operate in accordance with the distance-based feedback procedure

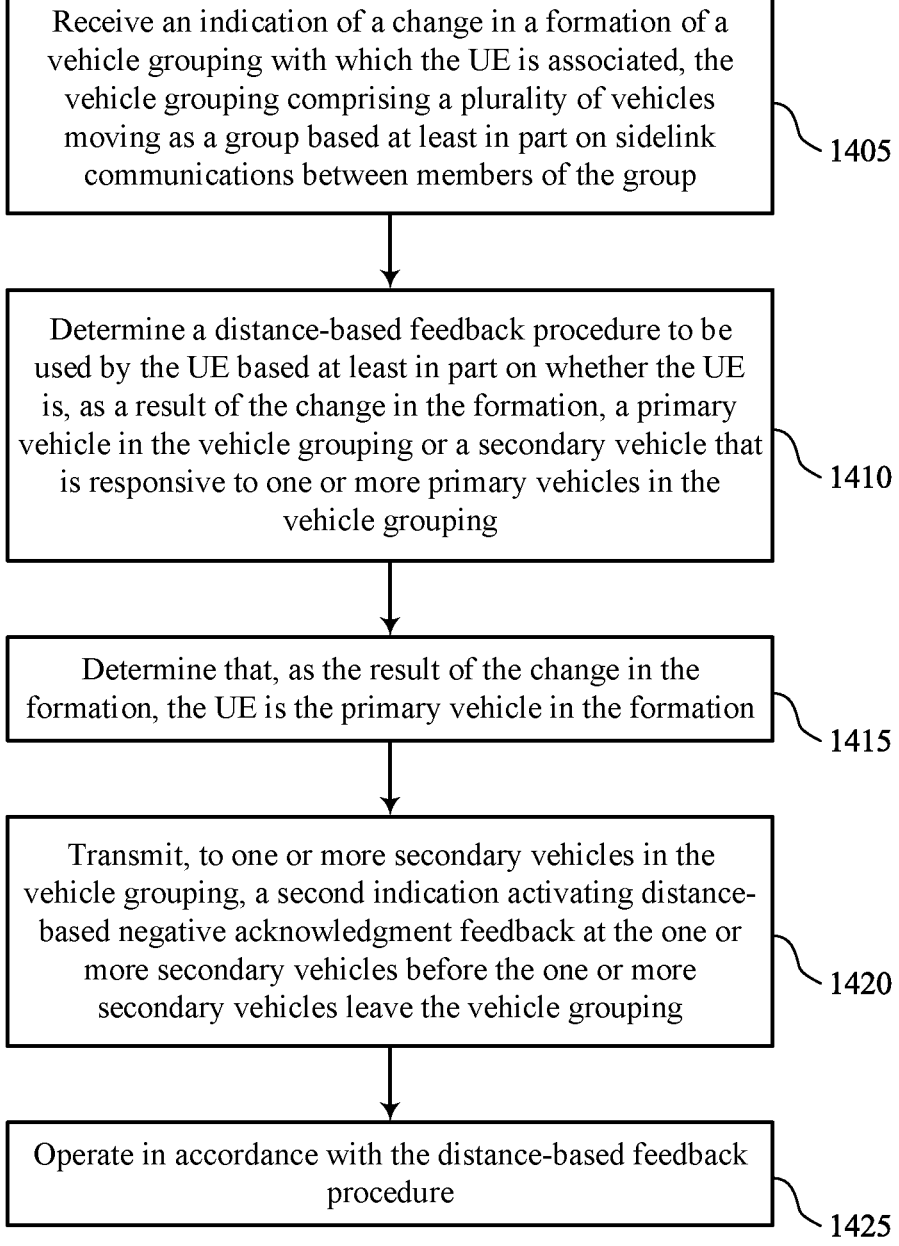

Receive an indication of a change in a formation of a vehicle grouping with which the UE is associated, the vehicle grouping comprising a plurality of vehicles moving as a group based at least in part on sidelink communications between members of the group    1405

Determine a distance-based feedback procedure to be used by the UE based at least in part on whether the UE is, as a result of the change in the formation, a primary vehicle in the vehicle grouping or a secondary vehicle that is responsive to one or more primary vehicles in the vehicle grouping    1410

Determine that, as the result of the change in the formation, the UE is the primary vehicle in the formation    1415

Transmit, to one or more secondary vehicles in the vehicle grouping, a second indication activating distance-based negative acknowledgment feedback at the one or more secondary vehicles before the one or more secondary vehicles leave the vehicle grouping    1420

Operate in accordance with the distance-based feedback procedure    1425

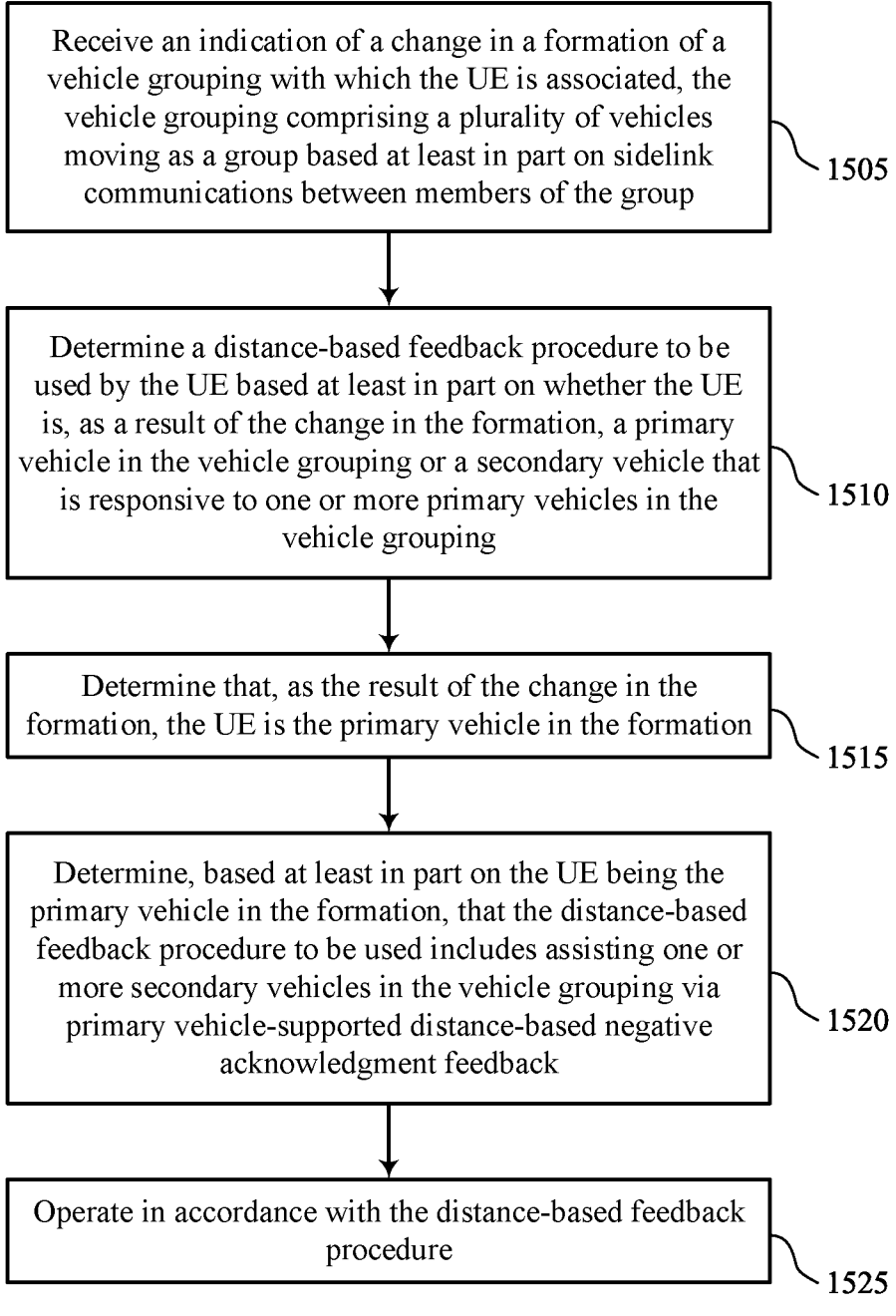

Receive an indication of a change in a formation of a vehicle grouping with which the UE is associated, the vehicle grouping comprising a plurality of vehicles moving as a group based at least in part on sidelink communications between members of the group

1505

Determine a distance-based feedback procedure to be used by the UE based at least in part on whether the UE is, as a result of the change in the formation, a primary vehicle in the vehicle grouping or a secondary vehicle that is responsive to one or more primary vehicles in the vehicle grouping

1510

Determine that, as the result of the change in the formation, the UE is the primary vehicle in the formation

1515

Determine, based at least in part on the UE being the primary vehicle in the formation, that the distance-based feedback procedure to be used includes assisting one or more secondary vehicles in the vehicle grouping via primary vehicle-supported distance-based negative acknowledgment feedback

1520

Operate in accordance with the distance-based feedback procedure

DISTANCE-BASED NACK PROCEDURES IN A VEHICULAR PLATOON

CROSS REFERENCE

The present Application is a 371 national stage filing of International PCT Application No. PCT/CN2021/107518 by Narula et al. entitled "DISTANCE-BASED NACK PRO-CEDURES IN A VEHICULAR PLATOON," filed Jul. 21, 2021, which is assigned to the assignee hereof, and which is expressly incorporated by reference in its entirety herein.

FIELD OF TECHNOLOGY

The following relates to wireless communications, including distance-based negative acknowledgement (NACK) procedures in a vehicular platoon.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations or one or more network access nodes, each simultaneously supporting communication for multiple communication devices, which may be otherwise known as user equipment (UE). Some wireless communications systems may support sidelink communications. That is, some wireless communications systems may support direct communications between two or more wireless devices, such as two or more UEs.

In vehicle-to-everything (V2X) systems, a vehicle UE may transmit feedback to other vehicles based on whether the other vehicles are within a threshold distance of the UE. For example, the vehicle UE may be an example of a receiving UE and may receive a message (e.g., a safety message, a coordination message, a directional message, among other examples) from a transmitting UE. The receiving UE may determine that there is an error associated with receiving the message and may determine to transmit (e.g., broadcast) a negative acknowledgment to the transmitting UE to indicate the error. However, if the transmitting UE is located outside a threshold distance (e.g., at a NACK distance that is outside a NACK range), the receiving UE may determine to refrain from transmitting NACK feedback regardless of whether the message was received with error. Likewise, the transmitting UE may determine whether to decode the NACK feedback based on the threshold distance as part of a distance-based NACK procedure.

In some cases, the receiving UE may be associated with a group or a platoon of vehicle UEs traveling in a same direction or in a similar fashion. For example, the receiving UE may be entering or exiting the platoon, or may be travelling within the platoon. Each UE of the platoon may be configured with a full set of V2X features or may be enabled with procedures associated with V2X communications including the distance-based NACK feedback.

SUMMARY

The described techniques relate to improved methods, systems, devices, and apparatuses that support distance-based negative acknowledgement (NACK) procedures in a vehicular platoon. Generally, the described techniques provide for enabling and disabling distance-based NACK procedures in a secondary user equipment (UE) of a platoon, as well as techniques for using calculations received from a primary UE for distance-based NACK procedures at a secondary UE of a platoon.

For example, vehicle UEs in a platoon may act as a single unit (e.g., may travel as a unit or may communicate with other UE outside the platoon as a unit, among other examples), and thus it may be inefficient for each vehicle UE of the platoon to be configured with a full set of V2X features. As such, some vehicles of the platoon may implement a distance-based NACK procedure that includes fewer calculations or less processing or may temporarily deactivate distance-back NACK reporting and decoding altogether.

Vehicle UEs in a platoon may be designated as lead or primary vehicles or may be designated as non-lead or secondary vehicles or UEs. In some examples, primary UEs may be configured to perform distance-based NACK on behalf of the entire platoon or may assist secondary UEs in performing distance-based NACK. For example, a primary UE may transmit signaling to a secondary UE that deactivates or activates distance-based NACK at the secondary UE. In some examples, secondary UEs may refrain from performing distance-based NACK autonomously or based on signaling from the primary UE. For example, the secondary UE may autonomously deactivate distance-based NACK upon joining the platoon, and may autonomously re-activate distance-based NACK prior to leaving the platoon. In some other examples, the primary UE may transmit control signaling to the secondary UE that deactivates the distance-based NACK at the secondary UE upon the secondary UE joining the platoon. The primary UE may also transmit signaling that re-activates the distance-based NACK at the secondary UE prior to the secondary UE leaving the platoon.

In some examples, the primary UE may transmit one or more parameters via sidelink (e.g., sidelink control information) that may be used by the secondary UE to determine when to transmit distance-based NACK. For example, the primary UEs may perform distance-based NACK, and may also transmit (e.g., forward) the same values used by the primary UE for performing the distance-based NACK to the secondary UEs for use in the performance of distance-based NACK at a secondary UE. The calculated and forwarded values may include a NACK distance value, a NACK range, a geodesic zone identifier (e.g., representing a location in the world), or global navigation satellite system (GNSS) coordinates. The secondary UE may participate in distance-based NACK, but rather than calculating NACK distance values, zone identifiers, or GNSS coordinates, the UE vehicles rely on the parameters already calculated (e.g., transmitted) by the primary UEs.

A method for wireless communication at a user equipment (UE) is described. The method may include receiving an indication of a change in a formation of a vehicle grouping with which the UE is associated, the vehicle grouping including a set of multiple vehicles moving as a group based on sidelink communications between members of the group, determining a distance-based feedback procedure to be used by the UE based on whether the UE is, as a result of the change in the formation, a primary vehicle in the vehicle grouping or a secondary vehicle that is responsive to one or more primary vehicles in the vehicle grouping, and operating in accordance with the distance-based feedback procedure.

An apparatus for wireless communication at a UE is described. The apparatus may include a processor, memory coupled with the processor, and instructions stored in the memory. The instructions may be executable by the processor to cause the apparatus to receive an indication of a change in a formation of a vehicle grouping with which the UE is associated, the vehicle grouping including a set of multiple vehicles moving as a group based on sidelink communications between members of the group, determine a distance-based feedback procedure to be used by the UE based on whether the UE is, as a result of the change in the formation, a primary vehicle in the vehicle grouping or a secondary vehicle that is responsive to one or more primary vehicles in the vehicle grouping, and operate in accordance with the distance-based feedback procedure.

Another apparatus for wireless communication at a UE is described. The apparatus may include means for receiving an indication of a change in a formation of a vehicle grouping with which the UE is associated, the vehicle grouping including a set of multiple vehicles moving as a group based on sidelink communications between members of the group, means for determining a distance-based feedback procedure to be used by the UE based on whether the UE is, as a result of the change in the formation, a primary vehicle in the vehicle grouping or a secondary vehicle that is responsive to one or more primary vehicles in the vehicle grouping, and means for operating in accordance with the distance-based feedback procedure.

A non-transitory computer-readable medium storing code for wireless communication at a UE is described. The code may include instructions executable by a processor to receive an indication of a change in a formation of a vehicle grouping with which the UE is associated, the vehicle grouping including a set of multiple vehicles moving as a group based on sidelink communications between members of the group, determine a distance-based feedback procedure to be used by the UE based on whether the UE is, as a result of the change in the formation, a primary vehicle in the vehicle grouping or a secondary vehicle that is responsive to one or more primary vehicles in the vehicle grouping, and operate in accordance with the distance-based feedback procedure.

Some examples of the method, apparatuses, and non-transitory computer-readable medium described herein may further include operations, features, means, or instructions for determining that, as the result of the change in the formation, the UE may be the secondary vehicle in the formation.

In some examples of the method, apparatuses, and non-transitory computer-readable medium described herein, determining the distance-based feedback procedure to be used by the UE may include operations, features, means, or instructions for determining, based on the UE being the secondary vehicle in the formation, that the distance-based feedback procedure to be used includes deactivation of distance-based negative acknowledgment feedback while the UE may be the secondary vehicle.

Some examples of the method, apparatuses, and non-transitory computer-readable medium described herein may further include operations, features, means, or instructions for deactivating distance-based negative acknowledgment feedback one or more duty cycles of the UE after the UE joins the vehicle grouping.

Some examples of the method, apparatuses, and non-transitory computer-readable medium described herein may further include operations, features, means, or instructions for reactivating the distance-based negative acknowledgment feedback upon determining that the UE may be no longer the secondary vehicle in the formation.

Some examples of the method, apparatuses, and non-transitory computer-readable medium described herein may further include operations, features, means, or instructions for reactivating distance-based negative acknowledgment feedback one or more duty cycles of the UE before the UE leaves the vehicle grouping.

In some examples of the method, apparatuses, and non-transitory computer-readable medium described herein, determining the distance-based feedback procedure to be used by the UE may include operations, features, means, or instructions for receiving a second indication from one or more primary vehicles in the vehicle grouping that the distance-based feedback procedure to be used by the UE includes deactivation of distance-based negative acknowledgment feedback while the UE may be the secondary vehicle.

Some examples of the method, apparatuses, and non-transitory computer-readable medium described herein may further include operations, features, means, or instructions for receiving a third indication from the one or more primary vehicles in the vehicle grouping that the UE may be to reactivate the distance-based negative acknowledgment feedback in connection with the UE no longer being the secondary vehicle in the formation.

In some examples of the method, apparatuses, and non-transitory computer-readable medium described herein, determining the distance-based feedback procedure to be used by the UE may include operations, features, means, or instructions for determining, based on the UE being the secondary vehicle in the formation, that the distance-based feedback procedure to be used includes primary vehicle-supported distance-based negative acknowledgment feedback while the UE may be the secondary vehicle.

Some examples of the method, apparatuses, and non-transitory computer-readable medium described herein may further include operations, features, means, or instructions for receiving from the primary vehicle, as part of the distance-based feedback procedure, sidelink control information that includes at least one of a negative acknowledgment distance value, a geodesic zone identifier, or a global navigation satellite system coordinate and using the at least one of the negative acknowledgment distance value, the geodesic zone identifier, or the global navigation satellite system coordinate as a basis for distance-based negative acknowledgment feedback at the UE.

In some examples of the method, apparatuses, and non-transitory computer-readable medium described herein, using the at least one of the negative acknowledgment distance value, the geodesic zone identifier, or the global navigation satellite system coordinate may include operations, features, means, or instructions for refraining from calculating any of the negative acknowledgment distance value, the geodesic zone identifier, or the global navigation satellite system coordinate while the UE may be the secondary vehicle.

In some examples of the method, apparatuses, and non-transitory computer-readable medium described herein, each of the negative acknowledgment distance value, the geodesic zone identifier, or the global navigation satellite system coordinate received from the primary vehicle may be representative of the vehicle grouping instead of an individual vehicle.

Some examples of the method, apparatuses, and non-transitory computer-readable medium described herein may further include operations, features, means, or instructions for using, as the distance-based feedback procedure and based on the UE being the secondary vehicle in the formation, a primary vehicle-supported distance-based negative acknowledgment feedback while the UE may be the secondary vehicle and transitioning from the primary vehicle-supported distance-based negative acknowledgment feedback to an updated distance-based feedback procedure to be used, where the updated distance-based feedback procedure includes deactivation of distance-based negative acknowledgment feedback while the UE may be the secondary vehicle.

In some examples of the method, apparatuses, and non-transitory computer-readable medium described herein, the transitioning may be based on an autonomous decision by the UE.

In some examples of the method, apparatuses, and non-transitory computer-readable medium described herein, the transitioning may be based on an instruction received from the primary vehicle.

Some examples of the method, apparatuses, and non-transitory computer-readable medium described herein may further include operations, features, means, or instructions for determining that, as the result of the change in the formation, the UE may be the primary vehicle in the formation.

In some examples of the method, apparatuses, and non-transitory computer-readable medium described herein, determining the distance-based feedback procedure to be used by the UE may include operations, features, means, or instructions for determining, based on the UE being the primary vehicle in the formation, that the distance-based feedback procedure to be used includes activation of distance-based negative acknowledgment feedback for the vehicle grouping while the UE may be the primary vehicle.

Some examples of the method, apparatuses, and non-transitory computer-readable medium described herein may further include operations, features, means, or instructions for transmitting, to one or more secondary vehicles in the vehicle grouping, a second indication deactivating distance-based negative acknowledgment feedback at the one or more secondary vehicles after the one or more secondary vehicles may have joined the vehicle grouping.

Some examples of the method, apparatuses, and non-transitory computer-readable medium described herein may further include operations, features, means, or instructions for transmitting, to one or more secondary vehicles in the vehicle grouping, a second indication activating distance-based negative acknowledgment feedback at the one or more secondary vehicles before the one or more secondary vehicles leave the vehicle grouping.

Some examples of the method, apparatuses, and non-transitory computer-readable medium described herein may further include operations, features, means, or instructions for transmitting, to a subset of all secondary vehicles in the vehicle grouping, a second indication deactivating distance-based negative acknowledgment feedback at the subset of all secondary vehicles.

Some examples of the method, apparatuses, and non-transitory computer-readable medium described herein may further include operations, features, means, or instructions for transmitting, to one or more secondary vehicles in the vehicle grouping, a second indication via a sidelink message to deactivate or activate distance-based negative acknowledgment feedback.

In some examples of the method, apparatuses, and non-transitory computer-readable medium described herein, the second indication may be included within sidelink control information of the sidelink message.

In some examples of the method, apparatuses, and non-transitory computer-readable medium described herein, determining the distance-based feedback procedure to be used by the UE may include operations, features, means, or instructions for determining, based on the UE being the primary vehicle in the formation, that the distance-based feedback procedure to be used includes assisting one or more secondary vehicles in the vehicle grouping via primary vehicle-supported distance-based negative acknowledgment feedback.

Some examples of the method, apparatuses, and non-transitory computer-readable medium described herein may further include operations, features, means, or instructions for transmitting, to the one or more secondary vehicles, one or more sidelink control parameters for the vehicle grouping, the one or more sidelink control parameters including at least one of a negative acknowledgment distance value, a geodesic zone identifier, or a global navigation satellite system coordinate.

Some examples of the method, apparatuses, and non-transitory computer-readable medium described herein may further include operations, features, means, or instructions for determining a length of the vehicle grouping and determining the one or more sidelink control parameters based on the length of the vehicle grouping.

In some examples of the method, apparatuses, and non-transitory computer-readable medium described herein, each of the negative acknowledgment distance value, the geodesic zone identifier, or the global navigation satellite system coordinate received from the primary vehicle may be representative of the vehicle grouping instead of an individual vehicle.

BRIEF DESCRIPTION OF THE DRAWINGS

FIGS. 10 through 15 show flowcharts illustrating methods that support distance-based NACK procedures in a vehicular platoon in accordance with aspects of the present disclosure.

DETAILED DESCRIPTION

Figure 1:
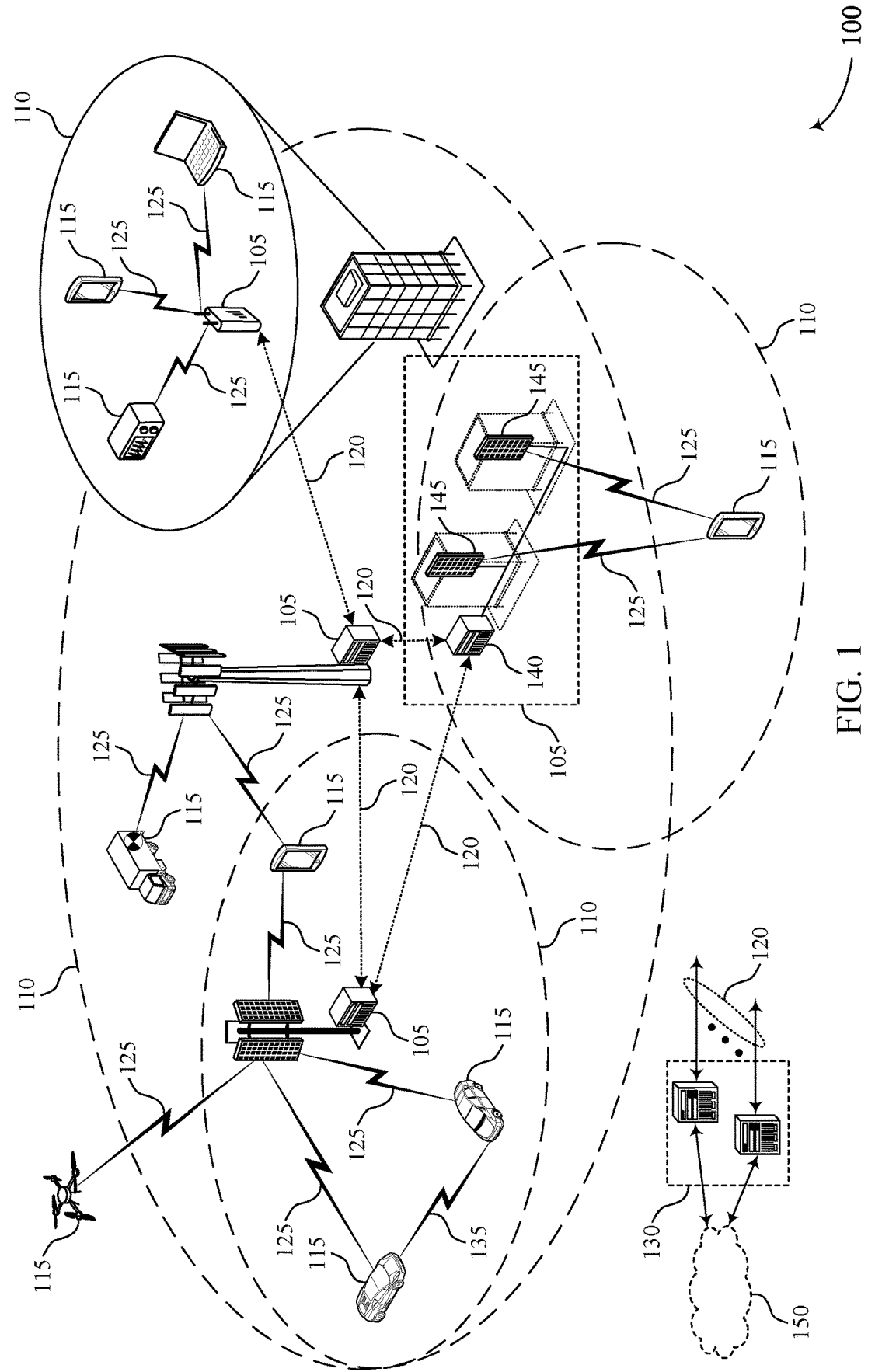
FIG. 1 illustrates an example of a wireless communications system that supports distance-based negative acknowledgment (NACK) procedures in a vehicular platoon in accordance with aspects of the present disclosure.

In some wireless communications systems, a user equipment (UE), such as a cellular vehicle-to-everything (C-V2X) device (e.g., a vehicle including a C-V2X component), may be configured to support sidelink communications between two or more wireless devices, such as two or more UEs, and may transmit a feedback channel (e.g., physical sidelink feedback channel (PSFCH)) for such sidelink communications. For example, a transmitting UE may transmit a message to a receiving UE. In some examples, there may be an error associated with receiving the message at the receiving UE and thus, the receiving UE may transmit hybrid automatic repeat request (HARQ) feedback. Specifically, the receiving UE may transmit a negative acknowledgment (NACK) if the message is not received successfully but may refrain from transmitting feedback if the message is received successfully. However, in some examples, the receiving UE may determine that it is located at a distance from the transmitting UE at which physical interaction with the transmitting UE is unlikely. For example, the receiving UE may calculate a two-dimensional (2D) or three-dimensional (3D) (e.g., geodesic) distance between its location and the location of the transmitting UE and may determine the distance to be outside a threshold distance. In such examples, the receiving UE may determine to refrain from transmitting the NACK regardless of whether the message is received with error or not based on the magnitude of the distance or the transmitting UE may determine not to decode feedback received from receiving UE outside the threshold distance. This may be referred to as a distance-based NACK procedure. The threshold distance for determining whether or not to transmit NACK feedback may be calculated by a UE or may be configured at the UE and may be based on a 2D or 3D distance (e.g., geodesic distance) from another UE. Further, the threshold distance may be dynamic and may vary as conditions around the UE vary or in other cases may be static. The threshold distance may be referred to as a NACK range and distances between receiving and transmitting UEs used to determine whether or not to transmit NACK (e.g., whether or not the distance is within the NACK range) may be referred to as NACK distances where both may be used in implementing distance-based NACK feedback procedures.

UEs, such as C-V2X UEs, may operate in a platooning mode. In the platooning mode, a primary or lead UE may be designated as a lead vehicle, and may be in communication with a number of UEs designated as secondary vehicles. When UEs are arranged in a platoon, the primary UE may transmit periodic or aperiodic messages or instructions associated with the platooning mode to the secondary UEs. In some examples, UEs in a platoon may be travelling at a close proximity to other UEs of the platoon and as such, the messages or instructions from the primary UE may guide the secondary UEs to safely operate and navigate in the platoon.

UEs in a platoon may act as a single unit (e.g., may travel as a unit or may communicate with other UE outside the platoon as a unit, among other examples), and as such it may not be necessary for each vehicle UE of the platoon to be configured with a full set of C-V2X features while operating as part of the platoon. For example, each vehicle UE may be configured to utilize any number of physical layer channels. However, to conserve resources, some UEs (e.g., secondary UEs) of the platoon may implement a distance-based NACK procedure that includes fewer calculations or less processing or may temporarily deactivate distance-back NACK reporting and decoding altogether. For example, it may be sufficient for the primary UE to perform distance-based NACK on behalf of the entire platoon or for the primary UE to perform and pass on the calculations associated with a distance-based NACK procedure to other UEs of the platoon.

For example, in some cases, a secondary UE may deactivate and reactivate distance-based NACK based on entering or exiting (e.g., engaging with, or disengaging with) a platoon, respectively. A UE, before entering a platoon, may be enabled with distance-based NACK. That is, the UE may be configured to transmit feedback for communications that are unsuccessfully received to transmitting UEs that are within the NACK range. However, upon engaging with a platoon, the UE may determine (e.g., based on received signaling) that it has become a secondary UE in the platoon. In such cases, the UE may autonomously determine to temporarily deactivate distance-based NACK procedures and instead, for example, may rely on a primary vehicle of the platoon to safely communicate with UEs outside of the platoon. Similarly, before disengaging with the platoon, the UE may autonomously reactivate distance-based NACK procedures. In some other examples, upon engaging or disengaging with the platoon, the secondary UE may receive signaling (e.g., sidelink control signaling (e.g., sidelink control information (SCI), PC5 signaling, sidelink signaling, or the like) from the primary UE that deactivates or activates (e.g., toggles) distance-based NACK respectively. In some other examples, upon entering the platoon, the UE may determine that is has become a primary UE of the platoon and may continue to perform distance-based NACK calculations. For example, the primary UE may transmit signaling deactivating and activating distance-based NACK at other secondary UEs of the platoon and may perform distance-based NACK based on its own location. That is, in general, a UE may be configured to deactivate/activate distance-based NACK while interacting with a platoon or may configure other UEs of a platoon to deactivate/activate distance-based NACK or may perform distance-based NACK on behalf of the platoon.

In some cases, a secondary UE may refrain from calculating NACK distances and instead may use information received from the primary UE to perform distance-based NACK. For example, a UE may calculate a number of values or parameters for performing distance-based NACK including a NACK distance value, a NACK range, a geodesic zone identifier (e.g., representing a location of another UE), or global navigation satellite system (GNSS) coordinates, or any combination thereof. However, upon engaging with a platoon, the UE may determine its role within the platoon to be a secondary UE may not temporarily deactivate distance-based NACK as described herein, however, the secondary UE may receive the values used to perform distance-based NACK from a primary vehicle of the platoon (e.g., via SCI, PC5, sidelink signaling or the like) and may thus refrain from calculating the values autonomously. That is, secondary UE may receive the values (e.g., Zone ID and NACK distance values) and overwrite (e.g., discard and save to persistent memory) their own values with the new ones shared by primary UE. The secondary UE may perform distance-based NACK using the values as it would outside the platoon. In other examples, the UE may engage with the platoon and may determine that it has become a primary UE of the platoon. In such examples, the primary UE may calculate the NACK distance value, the NACK range, the geodesic zone identifier (e.g., representing a location of another UE outside the platoon), or GNSS coordinates, or any combination thereof, and may transmit the values to one or more secondary UEs of the platoon. In such cases, the primary UE may determine a total length of the platoon and may calculate the distance-based NACK values based on location of the total length of the platoon rather than a location that is local to the primary UE.

In some implementations, a secondary UE of a platoon may temporarily deactivate distance-based NACK, may use values received from a primary UE of the platoon to perform distance-based NACK, or may perform some combination of both. That is, in some situations, a secondary UE may reactivate distance-based NACK while within the platoon and may perform the distance-based NACK procedure using values from the primary UE or vice versa. In any case, reducing the operational requirements at a secondary UE within a platoon may lower computational complexity at the secondary UE, thereby decreasing power consumption which may be especially pertinent for secondary UE such as electric vehicles. Additionally, reducing operational requirements at the secondary UE may reduce signaling overhead which may in turn conserve resources.

Aspects of the disclosure are initially described in the context of wireless communications systems. Aspects of the disclosure are then described in the context of process flows illustrating sidelink communications between UEs. Aspects of the disclosure are further illustrated by and described with reference to apparatus diagrams, system diagrams, and flowcharts that relate to distance-based NACK procedures in a vehicular platoon.

FIG. 1 illustrates an example of a wireless communications system 100 that supports distance-based NACK procedures in a vehicular platoon in accordance with aspects of the present disclosure. The wireless communications system 100 may include one or more base stations 105, one or more UEs 115, and a core network 130. In some examples, the wireless communications system 100 may be a Long Term Evolution (LTE) network, an LTE-Advanced (LTE-A) network, an LTE-A Pro network, or a New Radio (NR) network. In some examples, the wireless communications system 100 may support enhanced broadband communications, ultra-reliable (e.g., mission critical) communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

The time intervals for the base stations 105 or the UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally or alternatively, the smallest scheduling unit of the wireless communications system 100 may be dynamically selected (e.g., in bursts of shortened TTIs (STTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORE- SET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

Each base station 105 may provide communication coverage via one or more cells, for example a macro cell, a small cell, a hot spot, or other types of cells, or any combination thereof. The term "cell" may refer to a logical communication entity used for communication with a base station 105 (e.g., over a carrier) and may be associated with an identifier for distinguishing neighboring cells (e.g., a physical cell identifier (PCID), a virtual cell identifier (VCID), or others). In some examples, a cell may also refer to a geographic coverage area 110 or a portion of a geographic coverage area 110 (e.g., a sector) over which the logical communication entity operates. Such cells may range from smaller areas (e.g., a structure, a subset of structure) to larger areas depending on various factors such as the capabilities of the base station 105. For example, a cell may be or include a building, a subset of a building, or exterior spaces between or overlapping with geographic coverage areas 110, among other examples.

A macro cell generally covers a relatively large geographic area (e.g., several kilometers in radius) and may allow unrestricted access by the UEs 115 with service subscriptions with the network provider supporting the macro cell. A small cell may be associated with a lower-powered base station 105, as compared with a macro cell, and a small cell may operate in the same or different (e.g., licensed, unlicensed) frequency bands as macro cells. Small cells may provide unrestricted access to the UEs 115 with service subscriptions with the network provider or may provide restricted access to the UEs 115 having an association with the small cell (e.g., the UEs 115 in a closed subscriber group (CSG), the UEs 115 associated with users in a home or office). A base station 105 may support one or multiple cells and may also support communications over the one or more cells using one or multiple component carriers.

In some examples, a carrier may support multiple cells, and different cells may be configured according to different protocol types (e.g., MTC, narrow band IoT (NB-IoT), enhanced mobile broadband (eMBB)) that may provide access for different types of devices.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

Some UEs 115, such as MTC or IoT devices, may be low cost or low complexity devices and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay such information to a central server or application program that makes use of the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples, half-duplex communications may be performed at a reduced peak rate. Other power conservation techniques for the UEs 115 include entering a power saving deep sleep mode when not engaging in active communications, operating over a limited bandwidth (e.g., according to narrow band communications), or a combination of these techniques. For example, some UEs 115 may be configured for operation using a narrowband protocol type that is associated with a defined portion or range (e.g., set of subcarriers or resource blocks (RBs)) within a carrier, within a guard-band of a carrier, or outside of a carrier.

The wireless communications system 100 may be configured to support ultra-reliable communications or low-latency communications, or various combinations thereof. For example, the wireless communications system 100 may be configured to support ultra-reliable low-latency communications (URLLC) or mission critical communications. The UEs 115 may be designed to support ultra-reliable, low-latency, or critical functions (e.g., mission critical functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or general commercial applications. The terms ultra-reliable, low-latency, mission critical, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

In some systems, the D2D communication link 135 may be an example of a communication channel, such as a sidelink communication channel, between vehicles (e.g., UEs 115). In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some examples, vehicles in a V2X system may communicate with roadside infrastructure, such as roadside units, or with the network via one or more network nodes (e.g., base stations 105) using vehicle-to-network (V2N) communications, or with both.

The core network 130 may provide user authentication, access authorization, tracking. Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, typically in the range of 300 megahertz. (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHZ.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHZ industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally or alternatively, an antenna panel may support radio frequency beamforming for a signal transmitted via an antenna port.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

The UEs 115 and the base stations 105 may support retransmissions of data to increase the likelihood that data is received successfully. HARQ feedback is one technique for increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the medium access control (MAC) layer in poor radio conditions (e.g., low signal-to-noise conditions). In some examples, a device may support same-slot HARQ feedback, where the device may provide HARQ feedback in a specific slot for data received in a previous symbol in the slot. In other cases, the device may provide HARQ feedback in a subsequent slot, or according to some other time interval. For example, HARQ feedback indicating that a message is correctly received may be referred to as an acknowledgment (ACK) and HARQ feedback indicating that a message is received incorrectly (e.g., received in a fashion that may prompt a UE 115 to retransmit the message) may be referred to as a negative acknowledgment (NACK).

A UE 115 in wireless communications system 100 may, for example, be an example of a vehicle UE 115. In general, vehicle UEs 115 may be configured to transmit feedback channels for sidelink communications. For example, a transmitting vehicle UE 115 may transmit a message to a receiving vehicle UE 115. In some cases, there may be an error associated with receiving the message and the receiving vehicle UE 115 may transmit a NACK to inform the transmitting UE 115 of the error. However, in some examples, the receiving UE 115 may be located at a distance from the transmitting UE 115 in which physical interaction with the transmitting UE 115 is unlikely. In such examples, the receiving UE 115 may determine to refrain from transmitting the NACK regardless of whether the message is received with error or not based on the magnitude of the distance or the transmitting UE 115 may determine not to decode feedback received from outside the distance. This may be referred to as a distance-based NACK procedure. The distance may be calculated by the receiving UE 115 and may be based on a 2D or 3D distance (e.g., geodesic distance) between the transmitting UE 115 and the receiving UE 115. The distance may be referred to as a NACK distance and may be used in implementing distance-based NACK feedback procedures.

In some examples, the receiving UE 115 may be an example of a vehicle UE 115 that is entering or exiting a platoon, or is an established member of a platoon. For example, a number of vehicle UEs 115 may be organized in a group (e.g., a platoon) travelling together in a same direction or in a similar fashion. In some examples, the platoon may include a number of primary vehicle UEs 115 and a number of secondary vehicle UEs 115.

In some examples, the receiving UE 115 may, upon exiting or entering the platoon, receive an indication of a change in a formation of the platoon based at least in part on sidelink communications between UE 115 associated with the platoon. The receiving UE 115 may determine to implement a distance-based feedback procedure based on whether the receiving UE 115 is, as a result of the change in the platoon formation, a primary vehicle in the platoon or a secondary vehicle on the platoon. For example, a primary vehicle may lead (e.g., be in a lead position of the platoon, transmit signaling directing other members of the platoon, be in a rear position of the platoon, among other examples) secondary members of the platoon where secondary members of the platoon are in return responsive to the primary vehicles of the platoon. In some examples, the receiving UE 115 may operate in accordance with the distance-based feedback procedure (e.g., implement distance-based NACK) in a number of fashions based on whether the receiving UE 115 is a primary vehicle or a secondary vehicle.

Figure 2:
FIG. 2 illustrates an example of a wireless communications system that supports distance-based NACK procedures in a vehicular platoon in accordance with aspects of the present disclosure.
Figure 2:

FIG. 2 illustrates an example of a wireless communications system 200 that supports distance-based NACK procedures in a vehicular platoon in accordance with aspects of the present disclosure. In some examples, the wireless communications system 200 may implement aspects of the wireless communications system 100. For example, the wireless communications system 200 may include one or more UE 115, where each UE 115 may include or be an example of a UE 115 described with reference to FIG. 1. In some examples, each UE 115 may include a C-V2X device. The wireless communications system 200 may include features for improved communications between the UE 115, among other benefits.

In some examples, wireless communications system 200 may support multiple UE such as C-V2X devices (e.g., a vehicle including a C-V2X component). Each of UEs 115 may be configured to support sidelink communications between the UEs 115. For example, UE 115-c may be an example of a transmitting UE and UE 115-a may be an example of a receiving UE. The transmitting UE 115-c may transmit, to the UE 115-a, a safety message, a coordination message, a directional message, a control message or some combination thereof, via communication link 215. The receiving UE 115-a may transmit feedback (e.g., HARQ feedback) to the UE 115-c via communication link 215. Specifically, the receiving UE may transmit a negative acknowledgment (NACK) if the message is not received successfully but may refrain from transmitting feedback if the message is received successfully. In some examples, the UE 115-a may transmit feedback further based on whether the UE 115-c is within a threshold distance of the UE 115-a. For example, the receiving UE 115-a may determine that there is an error associated with receiving the message and may determine to transmit (e.g., broadcast, simulcast, unicast, or the like) a NACK to the transmitting UE 115-c via communication link 215 to indicate the error. However, if the transmitting UE 115-c is located outside a threshold distance (e.g., at a NACK distance that is outside a NACK range), the receiving UE 115-a may determine to refrain from transmitting NACK feedback via the communication link 215 regardless of whether the message was received with error. In some examples, the feedback may be transmitted via PSFCH 230.

The NACK range may be determined by the UE 115-a or may be configured by a network entity (not shown) at the UE 115-a. Additionally, the NACK range may be dynamic and may vary based on varying traveling conditions of the UE 115-a or may remain static. The NACK range may be based on a distance as which physical interaction between the UE 115-a and the UE 115-c is unlikely. In such examples, the receiving UE 115 may determine to refrain from transmitting the NACK regardless of whether the message is received with error or not based on the magnitude of the distance. This may be referred to as a distance-based NACK procedure. The distance may be calculated by the receiving UE 115 and may be based on a 2D or 3D distance (e.g., geodesic distance) between the transmitting UE 115-c and the receiving UE 115-a. The distance may be referred to as a NACK distance and may be used in implementing distance-based NACK feedback procedures.

Further the UEs 115 may be configured to operate in a platooning mode. For example, in the platooning mode, the UE 115-a may be designated as a lead vehicle, and may be in communication with a number of UEs designated as secondary vehicles. When UEs are arranged in a platoon, the primary UE 115-a may transmit periodic or aperiodic messages or instructions associated with the platooning mode to the secondary UEs. In some examples, UEs in a platoon may be travelling at a close proximity to other UEs of the platoon and as such, the messages or instructions from the primary UE 115-a may guide the secondary UEs to safely operate and navigate in the platoon. For example, reliability may be maintained even if not all UEs perform NACK transmission or NACK decoding because not all UEs may be directly engaged with UEs outside the platoon and performing NACK feedback or decoding may not necessarily increase reliability. UEs in a platoon may act as a single unit (e.g., may travel as a unit or may communicate with other UE outside the platoon as a unit, among other examples), and as such it may not be necessary for each vehicle UE of the platoon to be configured with a full set of C-V2X features while operating as part of the platoon (e.g., each physical layer channel) in order to maintain reliability. For example, while travelling in a platoon, each vehicle may not need to be configured to communicate over each channel and to conserve resources, some UEs (e.g., secondary UEs) of the platoon may implement a distance-based NACK procedure that includes fewer calculations or less processing or may temporarily deactivate distance-back NACK reporting altogether. For example, it may be sufficient for the primary UE 115-a to perform distance-based NACK on behalf of the entire platoon or for the primary UE to perform and pass on the calculations associated with a distance-based NACK procedure to other UEs of the platoon.

For example, in some cases, the UE 115-b may be a secondary UE 115-b and may deactivate and reactivate distance-based NACK based on entering or exiting (e.g., engaging with, or disengaging with) a platoon 220 associated with the UE 115-a, respectively. The UE 115-b, before entering the platoon 220, may be enabled with distance-based NACK. That is, the UE 115-b may be configured to transmit feedback via communications link 210 for communications that are unsuccessfully received to the transmitting UE 115-c if it is at a NACK distance within the NACK range. However, upon engaging with the platoon 220, the UE 115-b may determine (e.g., based on received signaling via communications link 205) that it has become a secondary UE 115-c in the platoon. In such cases, the UE 115-c may autonomously determine to temporarily deactivate distance-based NACK procedures and instead, for example, may rely on the primary UE 115-a to safely communicate with UEs outside of the platoon (e.g., UE 115-c). Similarly, before disengaging with the platoon, the UE 115-b may autonomously reactive distance-based NACK procedures. In some other examples, upon engaging or disengaging with the platoon, the secondary UE 115-c may receive SCI 235 from the primary UE 115-a that deactivates or activates (e.g., toggles) distance-based NACK, respectively. In some other examples, upon entering the platoon, the UE 115-b may determine that is has become a primary UE 115-b of the platoon and may continue to perform distance-based NACK calculations. For example, the primary UE 115-b may transmit SCI 235 via communications link 205 deactivating and activating distance-based NACK at the secondary UE 115-a and may perform distance-based NACK via communications link 210 based on its location 225. That is, in general, the UE 115-b may be configured to deactivate/activate distance-based NACK while interacting with the platoon 220) or may configure other UEs of a platoon (e.g., UE 115-*a*) to deactivate/activate distance-based NACK and may perform distance-based NACK on behalf of the platoon 220.

In some cases, the UE 115-*b* may be designated as a secondary UE 115-*c* and may refrain from calculating NACK distances and instead may use information received from the primary UE 115-*a* to perform distance-based NACK via communications link 210. For example, outside of the platoon 220, the UE 115-*b* may calculate a number of values or parameters for performing distance-based NACK including a NACK distance value between the UE 115-*c* and UE 115-*b*, a NACK range, a geodesic zone identifier (e.g., representing a location of the UE 115-*c*), or global navigation satellite system (GNSS) coordinates, or any combination thereof. However, upon engaging with the platoon 220, the UE 115-*b* may determine its role within the platoon to be a secondary UE and may not temporarily deactivate distance-based NACK as described herein, however, the secondary UE 115-*b* may receive the values used to perform distance-based NACK from the UE 115-*a* via SCI 235 and may thus refrain from calculating the values autonomously. The secondary UE 115-*b* may then proceed to perform distance-based NACK via communications link 210 using the values as it would outside the platoon 220. In other examples, the UE 115-*b* may engage with the platoon 220 and may determine that it has become a primary UE of the platoon 220. In such examples, the primary UE 115-*b* may calculate the NACK distance value, the NACK range, the geodesic zone identifier (e.g., representing a location of another UE outside the platoon), or GNSS coordinates, or any combination thereof, and may transmit the values to one or more secondary UEs (e.g., UE 115-*a*) of the platoon 220. In such cases, the primary UE 115-*b* may determine a total length or area of the platoon 220 and may calculate the distance-based NACK values based on location of the platoon 220 rather than the location 225 that is local to the primary UE 115-*b*.

In some implementations, the UE 115-*b* engaging with the platoon 220 may temporarily deactivate distance-based NACK, may use values received from the UE 115-*a* to perform distance-based NACK, may transmit values to the UE 115-*a*, or may perform some combination thereof. That is, in some situations, the UE 115-*b* may reactivate distance-based NACK while within the platoon and may perform the distance-based NACK procedure using values from the UE 115-*a* or vice versa. In some other situations, the UE 115-*b* may cease performing the distance-based NACK procedure using values from the UE 115-*a*, deactivate distance-based NACK while within the platoon, and instead may rely on the UE 115-*a* to perform distance-based NACK. In some other examples, the UE 115-*b* may be configured temporarily reactivate distance-based NACK while operating within the platoon 220.

In some examples, the UE 115-*b* may be configured to perform distance-based NACK with values from the UE 115-*a* and fallback to use deactivating distance-based NACK as deemed necessary or vice versa. Additionally, disabling distance-based NACK and preforming distance-based NACK using values calculated by the primary UE may be used interchangeably during operation which may be fully managed by the primary UE 115-*a* of the platoon. For example, the UE 115-*a* may switch distance-based NACK procedures if the platoon 220 is changing lanes or making a turn.

Figure 3:
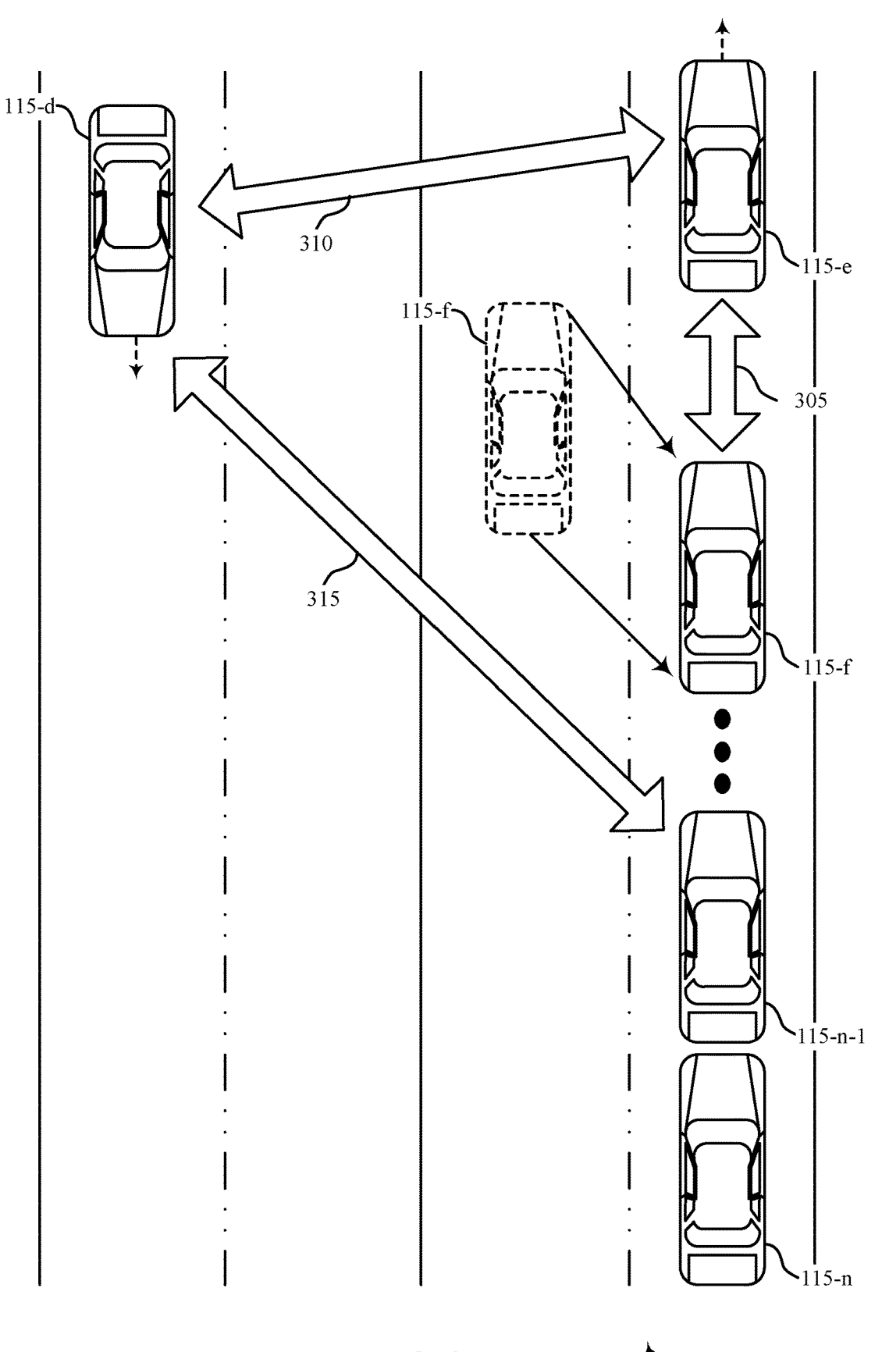
FIG. 3 illustrates an example of a wireless communications system that supports distance-based NACK procedures in a vehicular platoon in accordance with aspects of the present disclosure.

FIG. 3 illustrates an example of a wireless communications system 300 that supports distance-based NACK procedures in a vehicular platoon in accordance with aspects of the present disclosure. In some examples, the wireless communications system 300) may implement aspects of the wireless communications system 100 or 200. For example, the wireless communications system 300 may include one or more UE 115, where each UE 115 may include or be an example of a UE 115 described with reference to FIG. 1. In some examples, each UE 115 may include a C-V2X device. The wireless communications system 300 may include features for improved communications between the UE 115, among other benefits.

In some examples, the UEs 115-*e*, . . . , 115-*n*–1, and 115-*n* may be travelling together in a same direction or in a similar fashion as a platoon. For example, the platoon may be travelling in a first direction different from a second direction in which one or more other UE 115 (e.g., UE 115-*d*) are travelling. In some examples, the UE 115-*e*, . . . , 115-*n*–1, and 115-*n* may dynamically arrange themselves in the platoon. For example, the UE 115-*e* and the UE 115-*n* may be examples of primary vehicles and the UEs 115-*f* through 115-*n*–1 may be examples of secondary vehicles as described with reference to FIG. 1 and FIG. 2. Although the platoon shown includes two primary UE there may be any number of primary UE within a platoon (e.g., 1, 2, . . . , n–1). Primary UE 115-*e* and 115-*n* may transmit periodic or aperiodic instructions or messages to the secondary vehicles in the platoon to safely maintain navigation for the secondary UEs 115. In some examples, there may be a large number of vehicles in the platoon. For example, the UEs 115-*f* through 115-*n*–1 may include any number of UEs and in some cases up to 200 UEs. The UEs 115 of the platoon may be travelling at close distances. For example, the front of UE 115-*n* may be a little as 0.5 meters from the rear of UE 115-*n*–1 or vice versa, and likewise for other UE 115 travelling in the platoon. Further, the size of the platoon may vary as UE 115 enter and exit the platoon according to their ultimate destination or directive. The UE 115-*f* may enter the platoon and may become a secondary vehicle in relation to the platoon configuration. In such cases, the UE 115-*e* and the UE 115-*f* may receive signaling indicating a change in the platoon configuration. For example, UE 115-*e* may transmit signaling via communication link 305 to UE 115-*f* indicating that the UE 115-*f* is a secondary UE and likewise, UE 115-*f* may transmit signaling via communication link 305 to the UE 115-*e* indicating that the UE 115-*f* has joined the platoon.

In some examples, upon joining the platoon, the UE 115-*f* may autonomously determine to temporarily deactivate a distance-based NACK procedure. In some examples, deactivating the distance-based NACK procedure may include disabling or de-activating feedback channel associated with the procedure and may also include refraining from any periodic floating-point computations for deriving a NACK distance between the UE 115-*e* and the UE 115-*f*. For example, the UE 115-*f* may determine that it is a secondary UE and may toggle the distance-based NACK procedure. In such examples, the UE 115-*e* or the UE 115-*n* may perform distance-based NACK with the UE 115-*d* (e.g., via communication link 310) on behalf of the platoon. The UE 115-*f* may also determine that it will be leaving the platoon after some time operating within the platoon. The UE 115-*f* may determine to deactivate or toggle the distance-based NACK procedure since it will soon be travelling independently. In some other examples, the UE 115-*e* or the UE 115-*n* may transmit signaling (e.g., SCI, or another sidelink message) to deactivate distance-based NACK procedures at the UE 115-*f* entering the platoon. In some examples, the UE 115-*f* through 115-*n*–1 may each be configured (e.g., autonomously or by a primary UE) to deactivate distance-based NACK procedures while operating in the platoon. In some other examples, a portion of the UE 115-f through 115-n−1 may be configured to deactivate distance-based NACK procedures while others may continue to perform distance-based NACK procedures even while operating within the platoon. For example, UE 115-f may be signaled to or may autonomously deactivate distance-based NACK while UE 115-n may perform distance-based NACK with the UE 115-d via the communication link 315.

In some other examples, each of the UE 115-f through 115-n−1 may be configured to perform distance-based NACK based on values calculated by and received from a primary UE (e.g., UEs 115-e or 115-n). In some example, the UEs 115-f through 115-n−1 may be configured to use the values provided by the primary UEs 115-e or UE 115-n upon engaging with the platoon. In some other examples, the secondary UEs of the platoon may be operating within the platoon and may temporarily have distance-based NACK procedures deactivated by receiving SCI including the values to use for distance-based NACK. In such cases, the UEs 115-f through 115-n−1 may perform distance-based NACK as long as the values are provided by the UE 115-e or 115-n and may deactivate distance-based NACK if they are no longer receiving values. In some examples, a portion of the vehicles may be configured to perform distance-based NACK using the values provided by the primary UEs 115-e or 115-n, another portion may be configured with a distance-based NACK procedure similar to one that would be performed in the UE were travelling independently, and the distance-based NACK procedure may be deactivated for another portion of the UEs 115-f through 115-n−1, or any combination thereof.

In some examples, one or more of the secondary UE 115-f through 115-n−1 may experience a malfunction and may be temporarily toggled to perform distance-based NACK.

Figure 4:
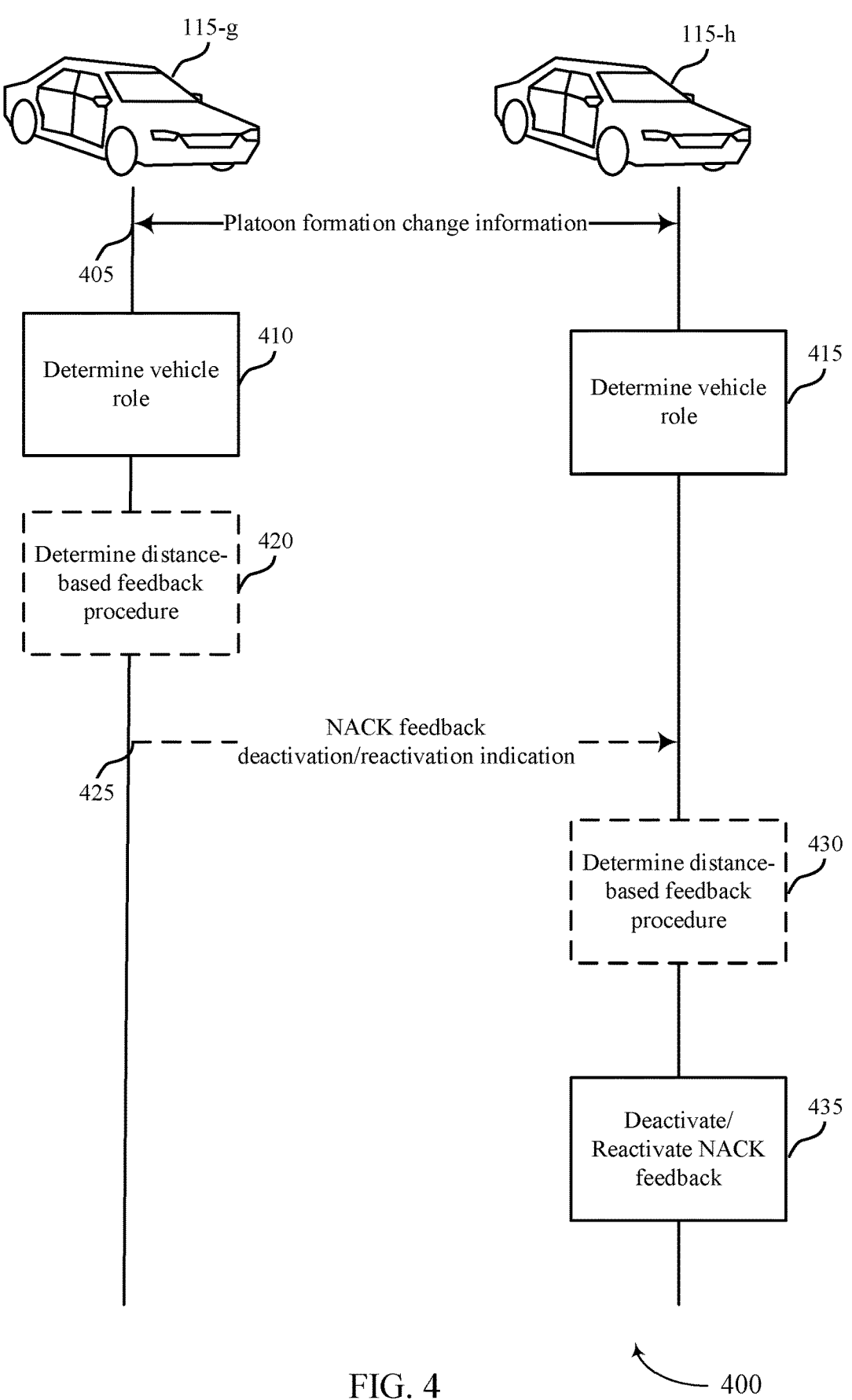
FIG. 4 illustrates an example of a process flow that supports distance-based NACK procedures in a vehicular platoon in accordance with aspects of the present disclosure.

FIG. 4 illustrates an example of a process flow 400 that supports distance-based NACK procedures in a vehicular platoon in accordance with aspects of the present disclosure. In some examples, the process flow 400 may implement aspects of the wireless communications system 100, 200, or 300. For example, the process flow 400 may include example operations associated with one or more components of a UE 115 described with reference to FIG. 1. The components may include a first UE 115-g and a second UE 115-h. In the following description of the process flow 400, the operations between the components may be performed in a different order than the example order shown, or the operations performed by the components may be performed in different orders or at different times or by different devices. Some operations may also be omitted from the process flow 400, and other operations may be added to the process flow 400. The operations performed by the components may support improvements to communications between UEs, among other benefits.

At 405, the UE 115-g or the UE 115-h, or both may receive an indication that a configuration of a platoon associated with the UE 115-g or the UE 115-h, or both has changed. For example, the UE 115-g may receive, from the UE 115-h, an indication that the UE 115-h has engaged with the platoon. In some other examples, the UE 115-h may receive, from the UE 115-g, an indication that the UE-h is joining or is going to join the platoon.

At 410, the UE 115-g may determine a role associated with the platoon. For example, the UE 115-g may determine it is a primary vehicle of the platoon based on the UE 115-h joining the platoon. In some other examples, the indication at 405 may indicate that a different UE (not shown) has changed the configuration of the platoon and the role of the UE 115-g may change at 410. For example: if a disengaging UE indicated at 405 is a primary UE, the UE 115-g may determine that its role has changed from secondary to primary to take the place of the disengaging UE. In some examples, the UE 115-g became a primary UE 115-g when it engaged with the platoon.

At 415, the UE 115-h may determine a role associated with the platoon. For example, the UE 115-h may have entered the platoon and may determine that it is a secondary UE 115-h within the platoon. In some other examples, the indication at 405 may indicate that a different UE has changed the configuration of the platoon and the role of the UE 115-h may change at 410. For example: if an engaging UE enters as a primary UE, the UE 115-h may determine that its role has changed from primary to secondary to allow the engaging UE to lead the platoon. That is, there may be a number of reasons a role of the UE 115-g or 115-h may change including changes in the configuration of the platoon, control information from other UE or base stations, a change in course, among other examples. While the roles of the UE 115-g and UE 115-h may change based on the activities of other UE associated with the platoon, the role of the UE 115-g or UE 115-h need not necessarily change whenever another UE enters or exits the platoon. That is, the role of the UE 115-g or UE 115-h may sometimes remain static if a UE engages or disengages with the platoon or may change.

At 415, the UE 115-h may be a secondary UE and as such may receive an indication to deactivate or deactivate distance-based NACK procedures at the UE 115-h. For example, the UE 115-h may be a secondary UE and, upon engaging or prior to disengaging with the platoon, may receive an indication from the UE 115-g (which in this example may be a primary UE) deactivating or activating distance-based NACK at the UE 115-g.

In some examples, at 420, the primary UE 115-g and may determine to disable distance-based NACK at some or all of the secondary UEs (e.g., including UE 115-h) while engaged with the platoon. In such cases, at 425, the UE 115-h may transmit an indication to the UE 115-g to activate or deactivate distance-based NACK depending on whether the UE 115-g has joined or is leaving the platoon and, at, 435, the UE 115-g may temporarily deactivate or activate its distance-based NACK feedback procedure based on receiving the indication at 425.

At 430, the UE 115-h may determine a distance-based feedback procedure. For example, the UE 115-h may receive the indication at 425 and may determine how or if it will perform a distance-based feedback procedure (e.g., the UE 115-h may determine to deactivate or activate the distance-based NACK procedure based on receiving the indication at 425) and, at 435, the UE 115-h may temporarily deactivate or activate the distance-based NACK feedback procedure based on the determining. In some other examples, the UE 115-h may not receive an indication from the primary UE 115-g and instead may autonomously determine to temporarily activate or deactivate the distance-based NACK procedure based on interacting with the platoon configuration.

Figure 5:
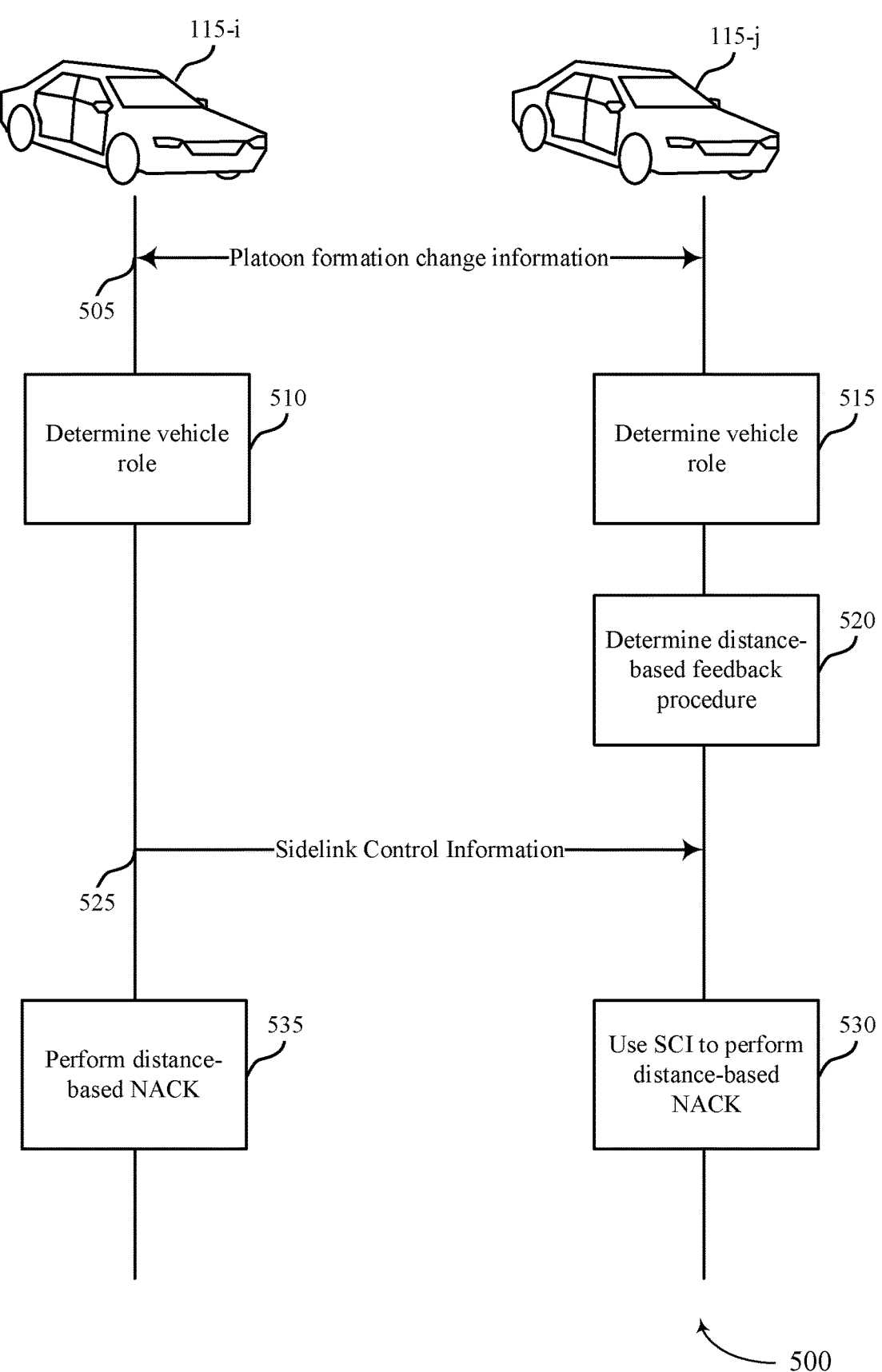
FIG. 5 illustrates an example of a process flow that supports distance-based NACK procedures in a vehicular platoon in accordance with aspects of the present disclosure.

FIG. 5 illustrates an example of a process flow 500 that supports distance-based NACK procedures in a vehicular platoon in accordance with aspects of the present disclosure. In some examples, the process flow 500 may implement aspects of the wireless communications system 100, 200, or 300. For example, the process flow 500 may include example operations associated with one or more components of a UE 115 described with reference to FIG. 1. The components may include a first UE **115-*i* and a second UE 115-*j*. In the following description of the process flow 400, the operations between the components may be performed in a different order than the example order shown, or the operations performed by the components may be performed in different orders or at different times or may be performed by different devices. Some operations may also be omitted from the process flow 500, and other operations may be added to the process flow 500**. The operations performed by the components may support improvements to communications between UEs, among other benefits.

At 505, the UE **115-*i* or the UE 115-*j*, or both may receive an indication that a configuration of a platoon associated with the UE 115-*i* or the UE 115-*j*, or both has changed. For example, the UE 115-*i* may receive, from the UE 115-*j*, an indication that the UE 115-*j* has engaged with the platoon or vice versa. In some other examples, the UE 115-*j* may receive, from the UE 115-*i***, an indication that the UE-j is joining or is going to join the platoon or vice versa.

At 510, the UE **115-*i* may determine a role associated with the platoon. For example, the UE 115-*i* may determine it is a primary vehicle of the platoon based on the UE 115-*j* joining the platoon. In some other examples, the indication at 405 may indicate that a different UE (not shown) has changed the configuration of the platoon and the role of the UE 115-*i* may change at 410. For example: if a disengaging UE indicated at 405 is a primary UE, the UE 115-*i* may determine that its role has changed from secondary to primary to take the place of the disengaging UE. In some examples, the UE 115-*i* became a primary UE 115-*i*** when it engaged with the platoon.

At 515, the UE **115-*j* may determine a role associated with the platoon. For example, the UE 115-*j* may have entered the platoon and may determine that it is a secondary UE 115-*j* within the platoon. In some other examples, the indication at 405 may indicate that a different UE has changed the configuration of the platoon and the role of the UE 115-*j* may change at 410. For example: if an engaging UE enters as a primary UE, the UE 115-*j* may determine that its role has changed from primary to secondary to allow the engaging UE to lead the platoon. That is, there may be a number of reasons a role of the UE 115-*i* or 115-*j* may change including changes in the configuration of the platoon, control information from other UE or base stations, a change in course, among other examples. While the roles of the UE 115-*i* and UE 115-*j* may change based on the activities of other UE associated with the platoon, the role of the UE 115-*i* or UE 115-*j* need not necessarily change whenever another UE enters or exits the platoon. That is, the role of the UE 115-*i* or UE 115-*j*** may sometimes remain static if a UE engages or disengages with the platoon or may change.

At 520, the UE **115-*j* may determine a distance-based feedback procedure. That is, the UE 115-*j* may determine how or if it will perform a distance-based feedback procedure based on its role and interaction with the platoon configuration. For example, the secondary UE 115-*j* may determine that the distance-based feedback procedure includes performing distance-based NACK using values computed by and received from the primary UE 115-*i***.

At 525, the secondary UE **115-*j* may receive SCI from the primary UE 115-*i* including a number of values or parameters for performing a distance-based NACK procedure. The received SCI may include one or more of a negative acknowledgment distance value, a geodesic zone identifier, or GNSS coordinates, or some combination thereof. Based on receiving the SCI, at 530, the UE 115-*j* may refrain from calculating a negative acknowledgment distance value, a geodesic zone identifier, or GNSS coordinates and may use the values received from the primary UE 115-*i* to perform distance-based NACK. For example, the UE 115-*j* may copy the SCI payload from the primary UE 115-*i* into SCI of a control channel at the UE 115-*j* and may perform distance-based NACK as it would if the UE 115-*j*** has calculated its own values.

At 535, the primary UE **115-*i* may perform distance-based NACK using the values it calculated and transmitted to the UE 115-*j*. For example, the UE may perform distance-based NACK using the negative acknowledgment distance value, the geodesic zone identifier, or the GNSS coordinates, or some combination thereof, regardless of the distance-based NACK procedure performed at the UE 115-*j***.

Figure 6:
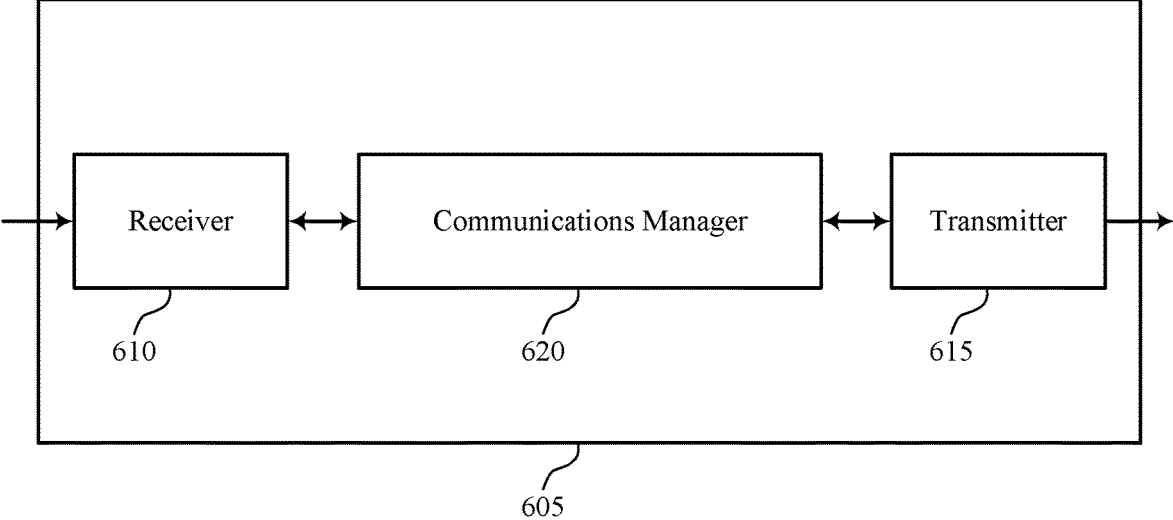
FIGS. 6 and 7 show block diagrams of devices that support distance-based NACK procedures in a vehicular platoon in accordance with aspects of the present disclosure.

FIG. 6 shows a block diagram 600 of a device 605 that supports distance-based NACK procedures in a vehicular platoon in accordance with aspects of the present disclosure. The device 605 may be an example of aspects of a UE 115 as described herein. The device 605 may include a receiver 610, a transmitter 615, and a communications manager 620. The device 605 may also include a processor. Each of these components may be in communication with one another (e.g., via one or more buses).

The receiver 610 may provide a means for receiving information such as packets, user data, control information, or any combination thereof associated with various information channels (e.g., control channels, data channels, information channels related to distance-based NACK procedures in a vehicular platoon). Information may be passed on to other components of the device 605. The receiver 610 may utilize a single antenna or a set of multiple antennas.

The transmitter 615 may provide a means for transmitting signals generated by other components of the device 605. For example, the transmitter 615 may transmit information such as packets, user data, control information, or any combination thereof associated with various information channels (e.g., control channels, data channels, information channels related to distance-based NACK procedures in a vehicular platoon). In some examples, the transmitter 615 may be co-located with a receiver 610 in a transceiver module. The transmitter 615 may utilize a single antenna or a set of multiple antennas.

The communications manager 620, the receiver 610, the transmitter 615, or various combinations thereof or various components thereof may be examples of means for performing various aspects of distance-based NACK procedures in a vehicular platoon as described herein. For example, the communications manager 620, the receiver 610, the transmitter 615, or various combinations or components thereof may support a method for performing one or more of the functions described herein.

In some examples, the communications manager 620, the receiver 610, the transmitter 615, or various combinations or components thereof may be implemented in hardware (e.g., in communications management circuitry). The hardware may include a processor, a digital signal processor (DSP), an application-specific integrated circuit (ASIC), a field-programmable gate array (FPGA) or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally or alternatively, in some examples, the communications manager 620, the receiver 610, the transmitter 615, or various combinations or components thereof may be implemented in code (e.g., as communications management software or firmware) executed by a processor. If implemented in code executed by a processor, the functions of the communications manager 620, the receiver 610, the transmitter 615, or various combinations or components thereof may be performed by a general-purpose processor, a DSP, a central processing unit (CPU), an ASIC, an FPGA, or any combination of these or other programmable logic devices (e.g., configured as or otherwise supporting a means for performing the functions described in the present disclosure).

In some examples, the communications manager 620 may be configured to perform various operations (e.g., receiving, monitoring, transmitting) using or otherwise in cooperation with the receiver 610, the transmitter 615, or both. For example, the communications manager 620 may receive information from the receiver 610, send information to the transmitter 615, or be integrated in combination with the receiver 610, the transmitter 615, or both to receive information, transmit information, or perform various other operations as described herein.

The communications manager 620 may support wireless communication at a UE in accordance with examples as disclosed herein. For example, the communications manager 620 may be configured as or otherwise support a means for receiving an indication of a change in a formation of a vehicle grouping with which the UE is associated, the vehicle grouping including a set of multiple vehicles moving as a group based on sidelink communications between members of the group. The communications manager 620 may be configured as or otherwise support a means for determining a distance-based feedback procedure to be used by the UE based on whether the UE is, as a result of the change in the formation, a primary vehicle in the vehicle grouping or a secondary vehicle that is responsive to one or more primary vehicles in the vehicle grouping. The communications manager 620 may be configured as or otherwise support a means for operating in accordance with the distance-based feedback procedure.

By including or configuring the communications manager 620 in accordance with examples as described herein, the device 605 (e.g., a processor controlling or otherwise coupled to the receiver 610, the transmitter 615, the communications manager 620, or a combination thereof) may support techniques for reduced processing, reduced power consumption, more efficient utilization of communication resources, among other examples.

Figure 7:
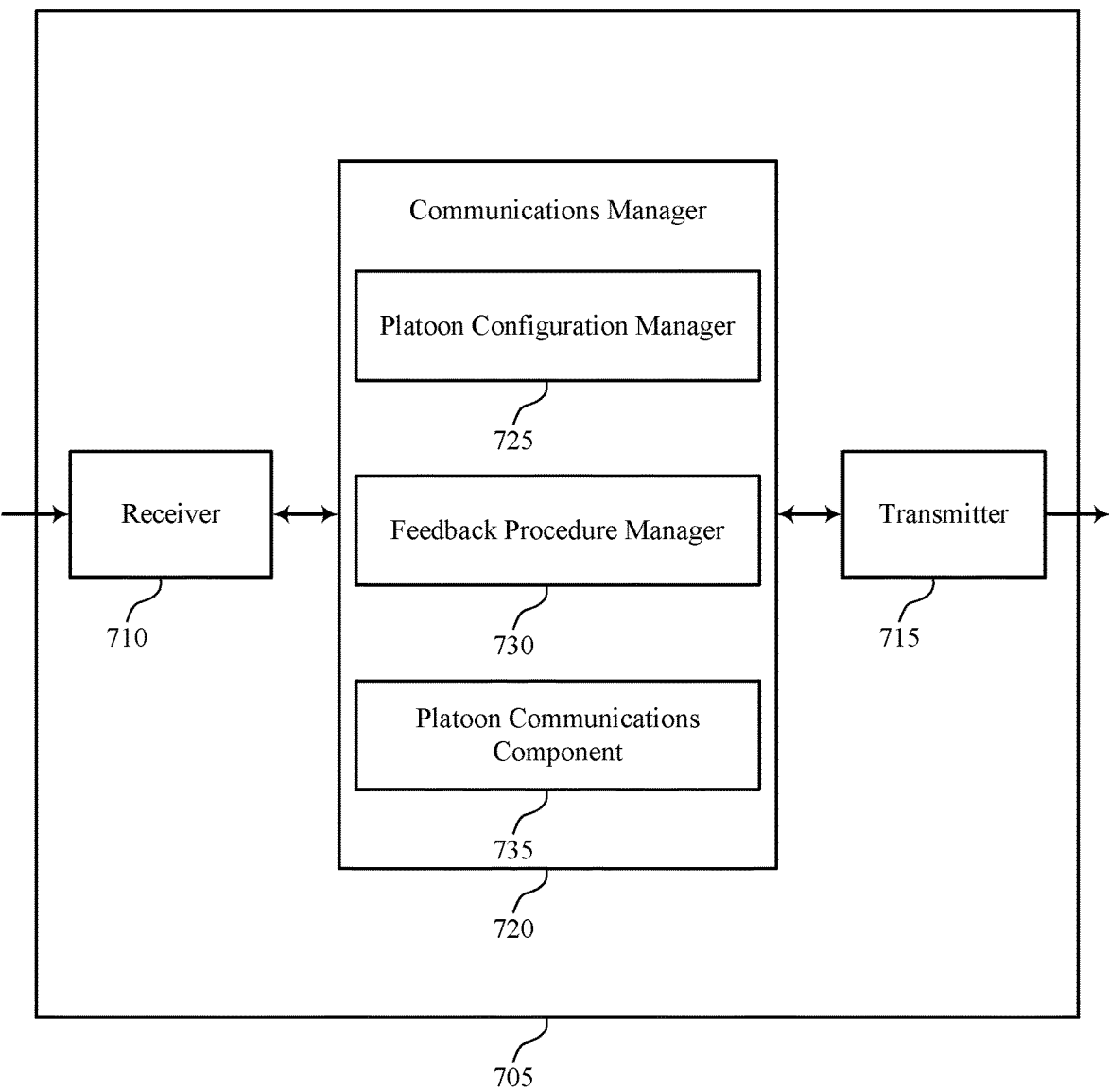

FIG. 7 shows a block diagram 700 of a device 705 that supports distance-based NACK procedures in a vehicular platoon in accordance with aspects of the present disclosure. The device 705 may be an example of aspects of a device 605 or a UE 115 as described herein. The device 705 may include a receiver 710, a transmitter 715, and a communications manager 720. The device 705 may also include a processor. Each of these components may be in communication with one another (e.g., via one or more buses).

The receiver 710 may provide a means for receiving information such as packets, user data, control information, or any combination thereof associated with various information channels (e.g., control channels, data channels, information channels related to distance-based NACK procedures in a vehicular platoon). Information may be passed on to other components of the device 705. The receiver 710 may utilize a single antenna or a set of multiple antennas.

The transmitter 715 may provide a means for transmitting signals generated by other components of the device 705. For example, the transmitter 715 may transmit information such as packets, user data, control information, or any combination thereof associated with various information channels (e.g., control channels, data channels, information channels related to distance-based NACK procedures in a vehicular platoon). In some examples, the transmitter 715 may be co-located with a receiver 710 in a transceiver module. The transmitter 715 may utilize a single antenna or a set of multiple antennas.

The device 705, or various components thereof, may be an example of means for performing various aspects of distance-based NACK procedures in a vehicular platoon as described herein. For example, the communications manager 720) may include a platoon configuration manager 725, a feedback procedure manager 730), a platoon communications component 735, or any combination thereof. The communications manager 720 may be an example of aspects of a communications manager 620 as described herein. In some examples, the communications manager 720, or various components thereof, may be configured to perform various operations (e.g., receiving, monitoring, transmitting) using or otherwise in cooperation with the receiver 710, the transmitter 715, or both. For example, the communications manager 720 may receive information from the receiver 710, send information to the transmitter 715, or be integrated in combination with the receiver 710, the transmitter 715, or both to receive information, transmit information, or perform various other operations as described herein.

The communications manager 720 may support wireless communication at a UE in accordance with examples as disclosed herein. The platoon configuration manager 725 may be configured as or otherwise support a means for receiving an indication of a change in a formation of a vehicle grouping with which the UE is associated, the vehicle grouping including a set of multiple vehicles moving as a group based on sidelink communications between members of the group. The feedback procedure manager 730) may be configured as or otherwise support a means for determining a distance-based feedback procedure to be used by the UE based on whether the UE is, as a result of the change in the formation, a primary vehicle in the vehicle grouping or a secondary vehicle that is responsive to one or more primary vehicles in the vehicle grouping. The platoon communications component 735 may be configured as or otherwise support a means for operating in accordance with the distance-based feedback procedure.

Figure 8:
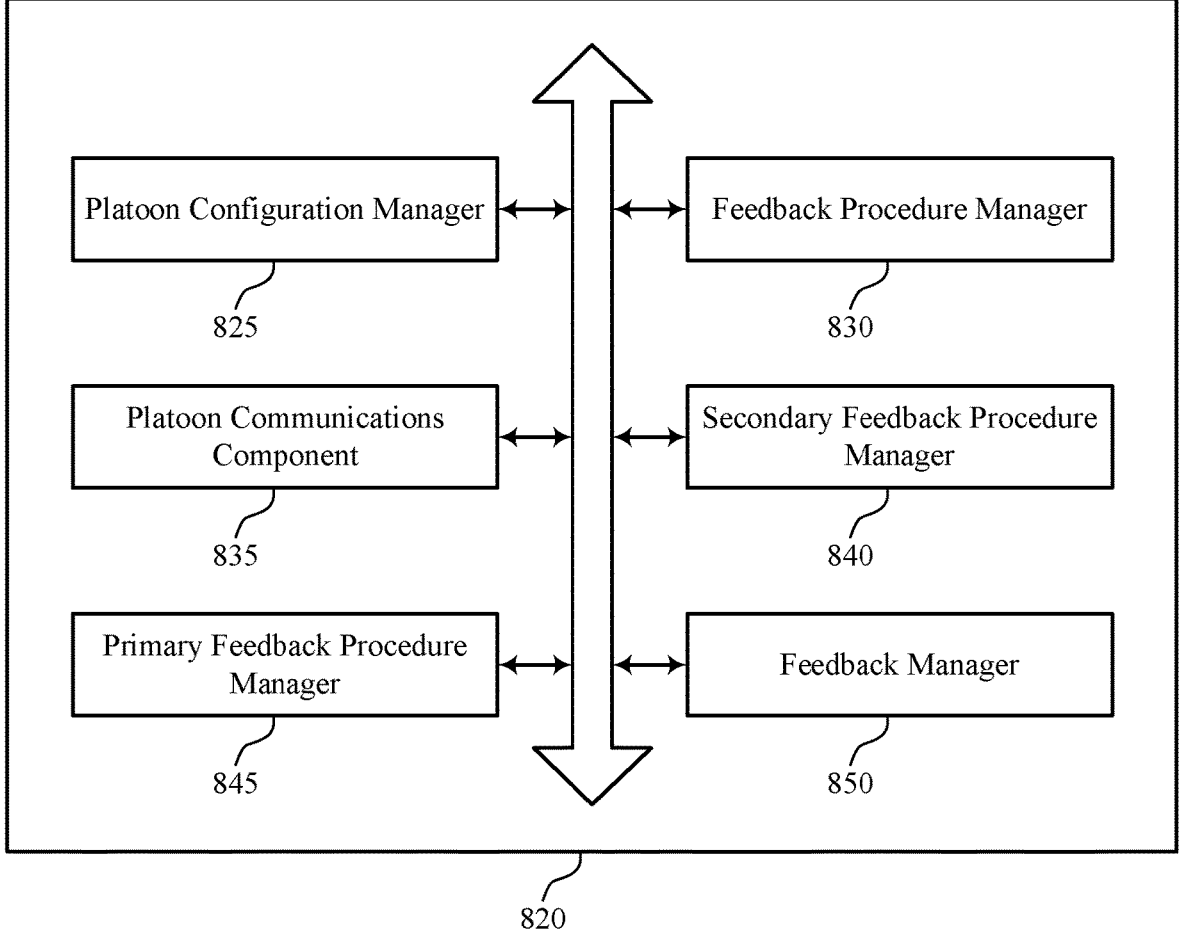
FIG. 8 shows a block diagram of a communications manager that supports distance-based NACK procedures in a vehicular platoon in accordance with aspects of the present disclosure.

FIG. 8 shows a block diagram 800 of a communications manager 820 that supports distance-based NACK procedures in a vehicular platoon in accordance with aspects of the present disclosure. The communications manager 820 may be an example of aspects of a communications manager 620, a communications manager 720, or both, as described herein. The communications manager 820, or various components thereof, may be an example of means for performing various aspects of distance-based NACK procedures in a vehicular platoon as described herein. For example, the communications manager 820 may include a platoon configuration manager 825, a feedback procedure manager 830, a platoon communications component 835, a secondary feedback procedure manager 840, a primary feedback procedure manager 845, a feedback manager 850, or any combination thereof. Each of these components may communicate, directly or indirectly, with one another (e.g., via one or more buses).

The communications manager 820 may support wireless communication at a UE in accordance with examples as disclosed herein. The platoon configuration manager 825 may be configured as or otherwise support a means for receiving an indication of a change in a formation of a vehicle grouping with which the UE is associated, the vehicle grouping including a set of multiple vehicles moving as a group based on sidelink communications between members of the group. The feedback procedure manager 830 may be configured as or otherwise support a means for determining a distance-based feedback procedure to be used by the UE based on whether the UE is, as a result of the change in the formation, a primary vehicle in the vehicle grouping or a secondary vehicle that is responsive to one or more primary vehicles in the vehicle grouping. The platoon communications component 835 may be configured as or otherwise support a means for operating in accordance with the distance-based feedback procedure.

In some examples, the platoon configuration manager 825 may be configured as or otherwise support a means for determining that, as the result of the change in the formation, the UE is the secondary vehicle in the formation.

In some examples, to support determining the distance-based feedback procedure to be used by the UE, the secondary feedback procedure manager 840 may be configured as or otherwise support a means for determining, based on the UE being the secondary vehicle in the formation, that the distance-based feedback procedure to be used includes deactivation of distance-based negative acknowledgment feedback while the UE is the secondary vehicle.

In some examples, the feedback manager 850 may be configured as or otherwise support a means for deactivating distance-based negative acknowledgment feedback one or more duty cycles of the UE after the UE joins the vehicle grouping.

In some examples, the feedback manager 850 may be configured as or otherwise support a means for reactivating the distance-based negative acknowledgment feedback upon determining that the UE is no longer the secondary vehicle in the formation.

In some examples, the feedback manager 850 may be configured as or otherwise support a means for reactivating distance-based negative acknowledgment feedback one or more duty cycles of the UE before the UE leaves the vehicle grouping.

In some examples, to support determining the distance-based feedback procedure to be used by the UE, the secondary feedback procedure manager 840 may be configured as or otherwise support a means for receiving a second indication from one or more primary vehicles in the vehicle grouping that the distance-based feedback procedure to be used by the UE includes deactivation of distance-based negative acknowledgment feedback while the UE is the secondary vehicle.

In some examples, the secondary feedback procedure manager 840 may be configured as or otherwise support a means for receiving a third indication from the one or more primary vehicles in the vehicle grouping that the UE is to reactivate the distance-based negative acknowledgment feedback in connection with the UE no longer being the secondary vehicle in the formation.

In some examples, to support determining the distance-based feedback procedure to be used by the UE, the secondary feedback procedure manager 840 may be configured as or otherwise support a means for determining, based on the UE being the secondary vehicle in the formation, that the distance-based feedback procedure to be used includes primary vehicle-supported distance-based negative acknowledgment feedback while the UE is the secondary vehicle.

In some examples, the platoon communications component 835 may be configured as or otherwise support a means for receiving from the primary vehicle, as part of the distance-based feedback procedure, sidelink control information that includes at least one of a negative acknowledgment distance value, a geodesic zone identifier, or a global navigation satellite system coordinate. In some examples, the secondary feedback procedure manager 840 may be configured as or otherwise support a means for using the at least one of the negative acknowledgment distance value, the geodesic zone identifier, or the global navigation satellite system coordinate as a basis for distance-based negative acknowledgment feedback at the UE.

In some examples, to support using the at least one of the negative acknowledgment distance value, the geodesic zone identifier, or the global navigation satellite system coordinate, the feedback manager 850 may be configured as or otherwise support a means for refraining from calculating any of the negative acknowledgment distance value, the geodesic zone identifier, or the global navigation satellite system coordinate while the UE is the secondary vehicle.

In some examples, each of the negative acknowledgment distance value, the geodesic zone identifier, or the global navigation satellite system coordinate received from the primary vehicle is representative of the vehicle grouping instead of an individual vehicle.

In some examples, the secondary feedback procedure manager 840 may be configured as or otherwise support a means for using, as the distance-based feedback procedure and based on the UE being the secondary vehicle in the formation, a primary vehicle-supported distance-based negative acknowledgment feedback while the UE is the secondary vehicle. In some examples, the secondary feedback procedure manager 840 may be configured as or otherwise support a means for transitioning from the primary vehicle-supported distance-based negative acknowledgment feedback to an updated distance-based feedback procedure to be used, where the updated distance-based feedback procedure includes deactivation of distance-based negative acknowledgment feedback while the UE is the secondary vehicle.

In some examples, the transitioning is based on an autonomous decision by the UE.

In some examples, the transitioning is based on an instruction received from the primary vehicle.

In some examples, the platoon configuration manager 825 may be configured as or otherwise support a means for determining that, as the result of the change in the formation, the UE is the primary vehicle in the formation.

In some examples, to support determining the distance-based feedback procedure to be used by the UE, the primary feedback procedure manager 845 may be configured as or otherwise support a means for determining, based on the UE being the primary vehicle in the formation, that the distance-based feedback procedure to be used includes activation of distance-based negative acknowledgment feedback for the vehicle grouping while the UE is the primary vehicle.

In some examples, the primary feedback procedure manager 845 may be configured as or otherwise support a means for transmitting, to one or more secondary vehicles in the vehicle grouping, a second indication deactivating distance-based negative acknowledgment feedback at the one or more secondary vehicles after the one or more secondary vehicles have joined the vehicle grouping.

In some examples, the primary feedback procedure manager 845 may be configured as or otherwise support a means for transmitting, to one or more secondary vehicles in the vehicle grouping, a second indication activating distance-based negative acknowledgment feedback at the one or more secondary vehicles before the one or more secondary vehicles leave the vehicle grouping.

In some examples, the primary feedback procedure manager 845 may be configured as or otherwise support a means for transmitting, to a subset of all secondary vehicles in the vehicle grouping, a second indication deactivating distance-based negative acknowledgment feedback at the subset of all secondary vehicles.

In some examples, the primary feedback procedure manager 845 may be configured as or otherwise support a means for transmitting, to one or more secondary vehicles in the vehicle grouping, a second indication via a sidelink message to deactivate or activate distance-based negative acknowledgment feedback.

In some examples, the second indication is included within sidelink control information of the sidelink message.

In some examples, to support determining the distance-based feedback procedure to be used by the UE, the primary feedback procedure manager 845 may be configured as or otherwise support a means for determining, based on the UE being the primary vehicle in the formation, that the distance-based feedback procedure to be used includes assisting one or more secondary vehicles in the vehicle grouping via primary vehicle-supported distance-based negative acknowledgment feedback.

In some examples, the platoon communications component 835 may be configured as or otherwise support a means for transmitting, to the one or more secondary vehicles, one or more sidelink control parameters for the vehicle grouping, the one or more sidelink control parameters including at least one of a negative acknowledgment distance value, a geodesic zone identifier, or a global navigation satellite system coordinate.

In some examples, the platoon configuration manager 825 may be configured as or otherwise support a means for determining a length of the vehicle grouping. In some examples, the platoon communications component 835 may be configured as or otherwise support a means for determining the one or more sidelink control parameters based on the length of the vehicle grouping.

In some examples, each of the negative acknowledgment distance value, the geodesic zone identifier, or the global navigation satellite system coordinate received from the primary vehicle is representative of the vehicle grouping instead of an individual vehicle.

Figure 9:
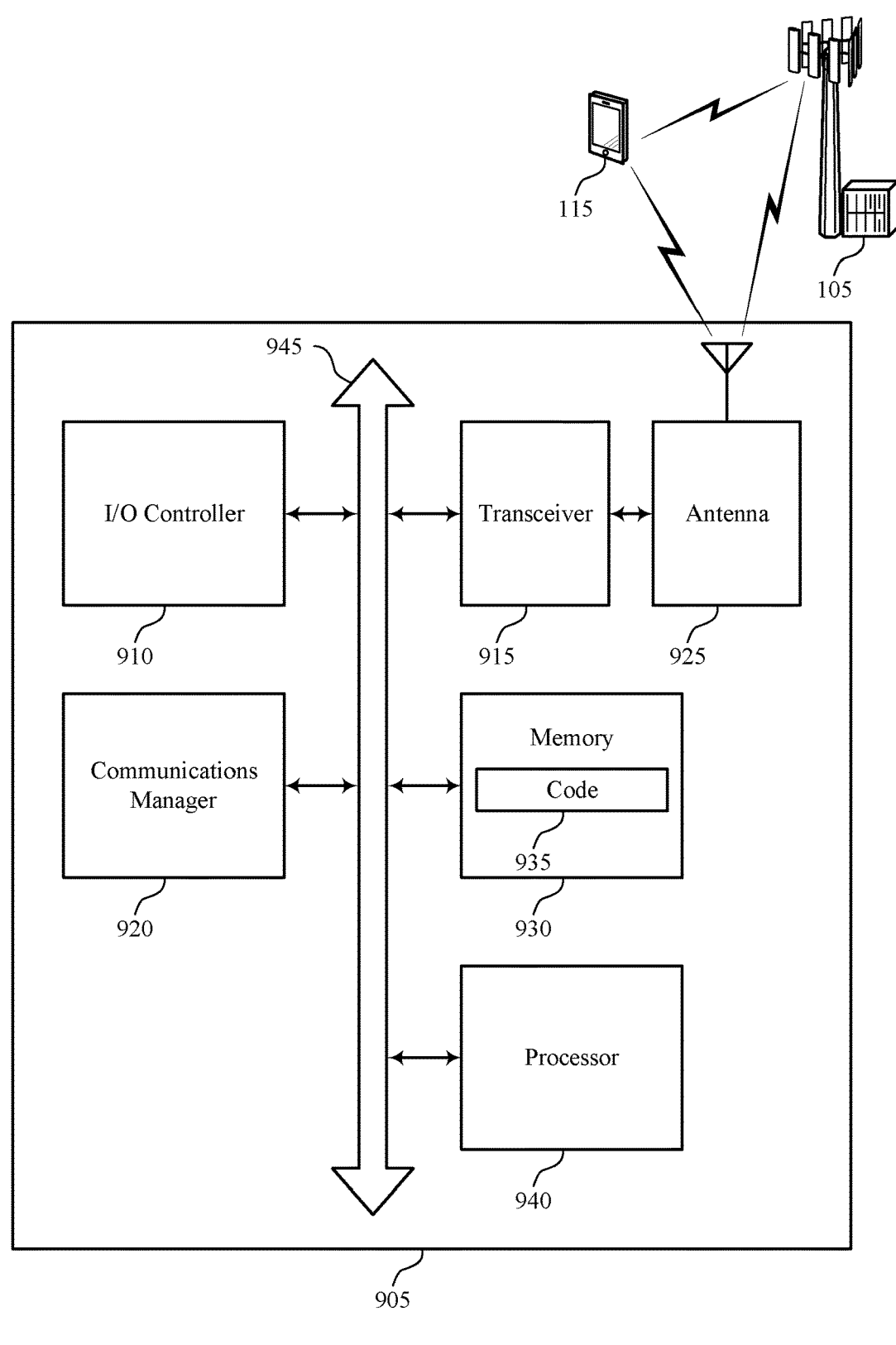
FIG. 9 shows a diagram of a system including a device that supports distance-based NACK procedures in a vehicular platoon in accordance with aspects of the present disclosure.

FIG. 9 shows a diagram of a system 900 including a device 905 that supports distance-based NACK procedures in a vehicular platoon in accordance with aspects of the present disclosure. The device 905 may be an example of or include the components of a device 605, a device 705, or a UE 115 as described herein. The device 905 may communicate wirelessly with one or more base stations 105, UEs 115, or any combination thereof. The device 905 may include components for bi-directional voice and data communications including components for transmitting and receiving communications, such as a communications manager 920, an input/output (I/O) controller 910, a transceiver 915, an antenna 925, a memory 930, code 935, and a processor 940. These components may be in electronic communication or otherwise coupled (e.g., operatively, communicatively, functionally, electronically, electrically) via one or more buses (e.g., a bus 945).

The I/O controller 910 may manage input and output signals for the device 905. The I/O controller 910 may also manage peripherals not integrated into the device 905. In some cases, the I/O controller 910 may represent a physical connection or port to an external peripheral. In some cases, the I/O controller 910 may utilize an operating system such as iOS®, ANDROID®, MS-DOS®, MS-WINDOWS®, OS/2®, UNIX®, LINUX®, or another known operating system. Additionally or alternatively, the I/O controller 910 may represent or interact with a modem, a keyboard, a mouse, a touchscreen, or a similar device. In some cases, the I/O controller 910 may be implemented as part of a processor, such as the processor 940. In some cases, a user may interact with the device 905 via the I/O controller 910 or via hardware components controlled by the I/O controller 910.

In some cases, the device 905 may include a single antenna 925. However, in some other cases, the device 905 may have more than one antenna 925, which may be capable of concurrently transmitting or receiving multiple wireless transmissions. The transceiver 915 may communicate bi-directionally, via the one or more antennas 925, wired, or wireless links as described herein. For example, the transceiver 915 may represent a wireless transceiver and may communicate bi-directionally with another wireless transceiver. The transceiver 915 may also include a modem to modulate the packets, to provide the modulated packets to one or more antennas 925 for transmission, and to demodulate packets received from the one or more antennas 925. The transceiver 915, or the transceiver 915 and one or more antennas 925, may be an example of a transmitter 615, a transmitter 715, a receiver 610, a receiver 710, or any combination thereof or component thereof, as described herein.

The memory 930 may include random access memory (RAM) and read-only memory (ROM). The memory 930 may store computer-readable, computer-executable code 935 including instructions that, when executed by the processor 940, cause the device 905 to perform various functions described herein. The code 935 may be stored in a non-transitory computer-readable medium such as system memory or another type of memory. In some cases, the code 935 may not be directly executable by the processor 940 but may cause a computer (e.g., when compiled and executed) to perform functions described herein. In some cases, the memory 930 may contain, among other things, a basic I/O system (BIOS) which may control basic hardware or software operation such as the interaction with peripheral components or devices.

The processor 940 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 940 may be configured to operate a memory array using a memory controller. In some other cases, a memory controller may be integrated into the processor 940. The processor 940 may be configured to execute computer-readable instructions stored in a memory (e.g., the memory 930) to cause the device 905 to perform various functions (e.g., functions or tasks supporting distance-based NACK procedures in a vehicular platoon). For example, the device 905 or a component of the device 905 may include a processor 940 and memory 930 coupled to the processor 940, the processor 940 and memory 930 configured to perform various functions described herein.

The communications manager 920 may support wireless communication at a UE in accordance with examples as disclosed herein. For example, the communications manager
920 may be configured as or otherwise support a means for
receiving an indication of a change in a formation of a
vehicle grouping with which the UE is associated, the
vehicle grouping including a set of multiple vehicles moving
as a group based on sidelink communications between
members of the group. The communications manager 920
may be configured as or otherwise support a means for
determining a distance-based feedback procedure to be used
by the UE based on whether the UE is, as a result of the
change in the formation, a primary vehicle in the vehicle
grouping or a secondary vehicle that is responsive to one or
more primary vehicles in the vehicle grouping. The com-
munications manager 920 may be configured as or otherwise
support a means for operating in accordance with the
distance-based feedback procedure.

By including or configuring the communications manager
920 in accordance with examples as described herein, the
device 905 may support techniques for improved user expe-
rience related to reduced processing, reduced power con-
sumption, more efficient utilization of communication
resources, improved coordination between devices, longer
battery life, improved utilization of processing capability,
among other examples.

In some examples, the communications manager 920 may
be configured to perform various operations (e.g., receiving,
monitoring, transmitting) using or otherwise in cooperation
with the transceiver 915, the one or more antennas 925, or
any combination thereof. Although the communications
manager 920 is illustrated as a separate component, in some
examples, one or more functions described with reference to
the communications manager 920 may be supported by or
performed by the processor 940, the memory 930, the code
935, or any combination thereof. For example, the code 935
may include instructions executable by the processor 940 to
cause the device 905 to perform various aspects of distance-
based NACK procedures in a vehicular platoon as described
herein, or the processor 940 and the memory 930 may be
otherwise configured to perform or support such operations.

FIG. 10 shows a flowchart illustrating a method 1000 that
supports distance-based NACK procedures in a vehicular
platoon in accordance with aspects of the present disclosure.
The operations of the method 1000 may be implemented by
a UE or its components as described herein. For example,
the operations of the method 1000 may be performed by a
UE 115 as described with reference to FIGS. 1 through 9. In
some examples, a UE may execute a set of instructions to
control the functional elements of the UE to perform the
described functions. Additionally or alternatively, the UE
may perform aspects of the described functions using spe-
cial-purpose hardware.

At 1005, the method may include receiving an indication
of a change in a formation of a vehicle grouping with which
the UE is associated, the vehicle grouping including a set of
multiple vehicles moving as a group based on sidelink
communications between members of the group. The opera-
tions of 1005 may be performed in accordance with
examples as disclosed herein. In some examples, aspects of
the operations of 1005 may be performed by a platoon
configuration manager 825 as described with reference to
FIG. 8.

At 1010, the method may include determining a distance-
based feedback procedure to be used by the UE based on
whether the UE is, as a result of the change in the formation,
a primary vehicle in the vehicle grouping or a secondary
vehicle that is responsive to one or more primary vehicles in
the vehicle grouping. The operations of 1010 may be performed in accordance with examples as disclosed herein. In
some examples, aspects of the operations of 1010 may be
performed by a feedback procedure manager 830 as
described with reference to FIG. 8.

At 1015, the method may include operating in accordance
with the distance-based feedback procedure. The operations
of 1015 may be performed in accordance with examples as
disclosed herein. In some examples, aspects of the opera-
tions of 1015 may be performed by a platoon communica-
tions component 835 as described with reference to FIG. 8.

FIG. 11 shows a flowchart illustrating a method 1100 that
supports distance-based NACK procedures in a vehicular
platoon in accordance with aspects of the present disclosure.
The operations of the method 1100 may be implemented by
a UE or its components as described herein. For example,
the operations of the method 1100 may be performed by a
UE 115 as described with reference to FIGS. 1 through 9. In
some examples, a UE may execute a set of instructions to
control the functional elements of the UE to perform the
described functions. Additionally or alternatively, the UE
may perform aspects of the described functions using spe-
cial-purpose hardware.

At 1105, the method may include receiving an indication
of a change in a formation of a vehicle grouping with which
the UE is associated, the vehicle grouping including a set of
multiple vehicles moving as a group based on sidelink
communications between members of the group. The opera-
tions of 1105 may be performed in accordance with
examples as disclosed herein. In some examples, aspects of
the operations of 1105 may be performed by a platoon
configuration manager 825 as described with reference to
FIG. 8.

At 1110, the method may include determining a distance-
based feedback procedure to be used by the UE based on
whether the UE is, as a result of the change in the formation,
a primary vehicle in the vehicle grouping or a secondary
vehicle that is responsive to one or more primary vehicles in
the vehicle grouping. The operations of 1110 may be per-
formed in accordance with examples as disclosed herein. In
some examples, aspects of the operations of 1110 may be
performed by a feedback procedure manager 830 as
described with reference to FIG. 8.

At 1115, the method may include determining that, as the
result of the change in the formation, the UE is the secondary
vehicle in the formation. The operations of 1115 may be
performed in accordance with examples as disclosed herein.
In some examples, aspects of the operations of 1115 may be
performed by a platoon configuration manager 825 as
described with reference to FIG. 8.

At 1120, the method may include determining, based on
the UE being the secondary vehicle in the formation, that the
distance-based feedback procedure to be used includes deac-
tivation of distance-based negative acknowledgment feed-
back while the UE is the secondary vehicle. The operations
of 1120 may be performed in accordance with examples as
disclosed herein. In some examples, aspects of the opera-
tions of 1120 may be performed by a secondary feedback
procedure manager 840 as described with reference to FIG.
8.

At 1125, the method may include operating in accordance
with the distance-based feedback procedure. The operations
of 1125 may be performed in accordance with examples as
disclosed herein. In some examples, aspects of the opera-
tions of 1125 may be performed by a platoon communica-
tions component 835 as described with reference to FIG. 8.

FIG. 12 shows a flowchart illustrating a method 1200 that
supports distance-based NACK procedures in a vehicular platoon in accordance with aspects of the present disclosure. The operations of the method 1200 may be implemented by a UE or its components as described herein. For example, the operations of the method 1200 may be performed by a UE 115 as described with reference to FIGS. 1 through 9. In some examples, a UE may execute a set of instructions to control the functional elements of the UE to perform the described functions. Additionally or alternatively, the UE may perform aspects of the described functions using special-purpose hardware.

At 1205, the method may include receiving an indication of a change in a formation of a vehicle grouping with which the UE is associated, the vehicle grouping including a set of multiple vehicles moving as a group based on sidelink communications between members of the group. The operations of 1205 may be performed in accordance with examples as disclosed herein. In some examples, aspects of the operations of 1205 may be performed by a platoon configuration manager 825 as described with reference to FIG. 8.

At 1210, the method may include determining a distance-based feedback procedure to be used by the UE based on whether the UE is, as a result of the change in the formation, a primary vehicle in the vehicle grouping or a secondary vehicle that is responsive to one or more primary vehicles in the vehicle grouping. The operations of 1210 may be performed in accordance with examples as disclosed herein. In some examples, aspects of the operations of 1210 may be performed by a feedback procedure manager 830 as described with reference to FIG. 8.

At 1215, the method may include determining that, as the result of the change in the formation, the UE is the secondary vehicle in the formation. The operations of 1215 may be performed in accordance with examples as disclosed herein. In some examples, aspects of the operations of 1215 may be performed by a platoon configuration manager 825 as described with reference to FIG. 8.

At 1220, the method may include determining, based on the UE being the secondary vehicle in the formation, that the distance-based feedback procedure to be used includes primary vehicle-supported distance-based negative acknowledgment feedback while the UE is the secondary vehicle. The operations of 1220 may be performed in accordance with examples as disclosed herein. In some examples, aspects of the operations of 1220 may be performed by a secondary feedback procedure manager 840 as described with reference to FIG. 8.

At 1225, the method may include receiving from the primary vehicle, as part of the distance-based feedback procedure, sidelink control information that includes at least one of a negative acknowledgment distance value, a geodesic zone identifier, or a global navigation satellite system coordinate. The operations of 1225 may be performed in accordance with examples as disclosed herein. In some examples, aspects of the operations of 1225 may be performed by a platoon communications component 835 as described with reference to FIG. 8.

At 1230, the method may include using the at least one of the negative acknowledgment distance value, the geodesic zone identifier, or the global navigation satellite system coordinate as a basis for distance-based negative acknowledgment feedback at the UE. The operations of 1230 may be performed in accordance with examples as disclosed herein. In some examples, aspects of the operations of 1230 may be performed by a secondary feedback procedure manager 840 as described with reference to FIG. 8.

At 1235, the method may include operating in accordance with the distance-based feedback procedure. The operations of 1235 may be performed in accordance with examples as disclosed herein. In some examples, aspects of the operations of 1235 may be performed by a platoon communications component 835 as described with reference to FIG. 8.

FIG. 13 shows a flowchart illustrating a method 1300 that supports distance-based NACK procedures in a vehicular platoon in accordance with aspects of the present disclosure. The operations of the method 1300 may be implemented by a UE or its components as described herein. For example, the operations of the method 1300 may be performed by a UE 115 as described with reference to FIGS. 1 through 9. In some examples, a UE may execute a set of instructions to control the functional elements of the UE to perform the described functions. Additionally or alternatively, the UE may perform aspects of the described functions using special-purpose hardware.

At 1305, the method may include receiving an indication of a change in a formation of a vehicle grouping with which the UE is associated, the vehicle grouping including a set of multiple vehicles moving as a group based on sidelink communications between members of the group. The operations of 1305 may be performed in accordance with examples as disclosed herein. In some examples, aspects of the operations of 1305 may be performed by a platoon configuration manager 825 as described with reference to FIG. 8.

At 1310, the method may include determining a distance-based feedback procedure to be used by the UE based on whether the UE is, as a result of the change in the formation, a primary vehicle in the vehicle grouping or a secondary vehicle that is responsive to one or more primary vehicles in the vehicle grouping. The operations of 1310 may be performed in accordance with examples as disclosed herein. In some examples, aspects of the operations of 1310 may be performed by a feedback procedure manager 830 as described with reference to FIG. 8.

At 1315, the method may include determining that, as the result of the change in the formation, the UE is the secondary vehicle in the formation. The operations of 1315 may be performed in accordance with examples as disclosed herein. In some examples, aspects of the operations of 1315 may be performed by a platoon configuration manager 825 as described with reference to FIG. 8.

At 1320, the method may include using, as the distance-based feedback procedure and based on the UE being the secondary vehicle in the formation, a primary vehicle-supported distance-based negative acknowledgment feedback while the UE is the secondary vehicle. The operations of 1320 may be performed in accordance with examples as disclosed herein. In some examples, aspects of the operations of 1320 may be performed by a secondary feedback procedure manager 840 as described with reference to FIG. 8.

At 1325, the method may include transitioning from the primary vehicle-supported distance-based negative acknowledgment feedback to an updated distance-based feedback procedure to be used, where the updated distance-based feedback procedure includes deactivation of distance-based negative acknowledgment feedback while the UE is the secondary vehicle. The operations of 1325 may be performed in accordance with examples as disclosed herein. In some examples, aspects of the operations of 1325 may be performed by a secondary feedback procedure manager 840 as described with reference to FIG. 8.

At 1330, the method may include operating in accordance with the distance-based feedback procedure. The operations of 1330 may be performed in accordance with examples as disclosed herein. In some examples, aspects of the operations of 1330 may be performed by a platoon communications component 835 as described with reference to FIG. 8.

FIG. 14 shows a flowchart illustrating a method 1400 that supports distance-based NACK procedures in a vehicular platoon in accordance with aspects of the present disclosure. The operations of the method 1400 may be implemented by a UE or its components as described herein. For example, the operations of the method 1400 may be performed by a UE 115 as described with reference to FIGS. 1 through 9. In some examples, a UE may execute a set of instructions to control the functional elements of the UE to perform the described functions. Additionally or alternatively, the UE may perform aspects of the described functions using special-purpose hardware.

At 1405, the method may include receiving an indication of a change in a formation of a vehicle grouping with which the UE is associated, the vehicle grouping including a set of multiple vehicles moving as a group based on sidelink communications between members of the group. The operations of 1405 may be performed in accordance with examples as disclosed herein. In some examples, aspects of the operations of 1405 may be performed by a platoon configuration manager 825 as described with reference to FIG. 8.

At 1410, the method may include determining a distance-based feedback procedure to be used by the UE based on whether the UE is, as a result of the change in the formation, a primary vehicle in the vehicle grouping or a secondary vehicle that is responsive to one or more primary vehicles in the vehicle grouping. The operations of 1410 may be performed in accordance with examples as disclosed herein. In some examples, aspects of the operations of 1410 may be performed by a feedback procedure manager 830 as described with reference to FIG. 8.

At 1415, the method may include determining that, as the result of the change in the formation, the UE is the primary vehicle in the formation. The operations of 1415 may be performed in accordance with examples as disclosed herein. In some examples, aspects of the operations of 1415 may be performed by a platoon configuration manager 825 as described with reference to FIG. 8.

At 1420, the method may include transmitting, to one or more secondary vehicles in the vehicle grouping, a second indication activating distance-based negative acknowledgment feedback at the one or more secondary vehicles before the one or more secondary vehicles leave the vehicle grouping. The operations of 1420 may be performed in accordance with examples as disclosed herein. In some examples, aspects of the operations of 1420 may be performed by a primary feedback procedure manager 845 as described with reference to FIG. 8.

At 1425, the method may include operating in accordance with the distance-based feedback procedure. The operations of 1425 may be performed in accordance with examples as disclosed herein. In some examples, aspects of the operations of 1425 may be performed by a platoon communications component 835 as described with reference to FIG. 8.

FIG. 15 shows a flowchart illustrating a method 1500 that supports distance-based NACK procedures in a vehicular platoon in accordance with aspects of the present disclosure. The operations of the method 1500 may be implemented by a UE or its components as described herein. For example, the operations of the method 1500 may be performed by a UE 115 as described with reference to FIGS. 1 through 9. In some examples, a UE may execute a set of instructions to control the functional elements of the UE to perform the described functions. Additionally or alternatively, the UE may perform aspects of the described functions using special-purpose hardware.

At 1505, the method may include receiving an indication of a change in a formation of a vehicle grouping with which the UE is associated, the vehicle grouping including a set of multiple vehicles moving as a group based on sidelink communications between members of the group. The operations of 1505 may be performed in accordance with examples as disclosed herein. In some examples, aspects of the operations of 1505 may be performed by a platoon configuration manager 825 as described with reference to FIG. 8.

At 1510, the method may include determining a distance-based feedback procedure to be used by the UE based on whether the UE is, as a result of the change in the formation, a primary vehicle in the vehicle grouping or a secondary vehicle that is responsive to one or more primary vehicles in the vehicle grouping. The operations of 1510 may be performed in accordance with examples as disclosed herein. In some examples, aspects of the operations of 1510 may be performed by a feedback procedure manager 830 as described with reference to FIG. 8.

At 1515, the method may include determining that, as the result of the change in the formation, the UE is the primary vehicle in the formation. The operations of 1515 may be performed in accordance with examples as disclosed herein. In some examples, aspects of the operations of 1515 may be performed by a platoon configuration manager 825 as described with reference to FIG. 8.

At 1520, the method may include determining, based on the UE being the primary vehicle in the formation, that the distance-based feedback procedure to be used includes assisting one or more secondary vehicles in the vehicle grouping via primary vehicle-supported distance-based negative acknowledgment feedback. The operations of 1520 may be performed in accordance with examples as disclosed herein. In some examples, aspects of the operations of 1520 may be performed by a primary feedback procedure manager 845 as described with reference to FIG. 8.

At 1525, the method may include operating in accordance with the distance-based feedback procedure. The operations of 1525 may be performed in accordance with examples as disclosed herein. In some examples, aspects of the operations of 1525 may be performed by a platoon communications component 835 as described with reference to FIG. 8.

The following provides an overview of aspects of the present disclosure:

Aspect 1: A method for wireless communication at a UE, comprising: receiving an indication of a change in a formation of a vehicle grouping with which the UE is associated, the vehicle grouping comprising a plurality of vehicles moving as a group based at least in part on sidelink communications between members of the group: determining a distance-based feedback procedure to be used by the UE based at least in part on whether the UE is, as a result of the change in the formation, a primary vehicle in the vehicle grouping or a secondary vehicle that is responsive to one or more primary vehicles in the vehicle grouping: and operating in accordance with the distance-based feedback procedure.

Aspect 2: The method of aspect 1, further comprising: determining that, as the result of the change in the formation, the UE is the secondary vehicle in the formation.

Aspect 3: The method of aspect 2, wherein determining the distance-based feedback procedure to be used by the UE comprises: determining, based at least in part on the UE being the secondary vehicle in the formation, that the distance-based feedback procedure to be used includes deactivation of distance-based negative acknowledgment feedback while the UE is the secondary vehicle.

Aspect 4: The method of aspect 3, further comprising: deactivating distance-based negative acknowledgment feedback one or more duty cycles of the UE after the UE joins the vehicle grouping.

Aspect 5: The method of aspect 4, further comprising: reactivating the distance-based negative acknowledgment feedback upon determining that the UE is no longer the secondary vehicle in the formation.

Aspect 6: The method of aspect 5, further comprising: reactivating distance-based negative acknowledgment feedback one or more duty cycles of the UE before the UE leaves the vehicle grouping.

Aspect 7: The method of any of aspects 2 through 6, wherein determining the distance-based feedback procedure to be used by the UE comprises: receiving a second indication from one or more primary vehicles in the vehicle grouping that the distance-based feedback procedure to be used by the UE includes deactivation of distance-based negative acknowledgment feedback while the UE is the secondary vehicle.

Aspect 8: The method of aspect 7, further comprising: receiving a third indication from the one or more primary vehicles in the vehicle grouping that the UE is to reactivate the distance-based negative acknowledgment feedback in connection with the UE no longer being the secondary vehicle in the formation.

Aspect 9: The method of any of aspects 2 through 8, wherein determining the distance-based feedback procedure to be used by the UE comprises: determining, based at least in part on the UE being the secondary vehicle in the formation, that the distance-based feedback procedure to be used includes primary vehicle-supported distance-based negative acknowledgment feedback while the UE is the secondary vehicle.

Aspect 10: The method of aspect 9, further comprising: receiving from the primary vehicle, as part of the distance-based feedback procedure, sidelink control information that includes at least one of a negative acknowledgment distance value, a geodesic zone identifier, or a global navigation satellite system coordinate: and using the at least one of the negative acknowledgment distance value, the geodesic zone identifier, or the global navigation satellite system coordinate as a basis for distance-based negative acknowledgment feedback at the UE.

Aspect 11: The method of aspect 10, wherein using the at least one of the negative acknowledgment distance value, the geodesic zone identifier, or the global navigation satellite system coordinate comprises: refraining from calculating any of the negative acknowledgment distance value, the geodesic zone identifier, or the global navigation satellite system coordinate while the UE is the secondary vehicle.

Aspect 12: The method of any of aspects 10 through 11, wherein each of the negative acknowledgment distance value, the geodesic zone identifier, or the global navigation satellite system coordinate received from the primary vehicle is representative of the vehicle grouping instead of an individual vehicle.

Aspect 13: The method of any of aspects 2 through 12, further comprising: using, as the distance-based feedback procedure and based at least in part on the UE being the secondary vehicle in the formation, a primary vehicle-supported distance-based negative acknowledgment feedback while the UE is the secondary vehicle: and transitioning from the primary vehicle-supported distance-based negative acknowledgment feedback to an updated distance-based feedback procedure to be used, wherein the updated distance-based feedback procedure includes deactivation of distance-based negative acknowledgment feedback while the UE is the secondary vehicle.

Aspect 14: The method of aspect 13, wherein the transitioning is based at least in part on an autonomous decision by the UE.

Aspect 15: The method of any of aspects 13 through 14, wherein the transitioning is based at least in part on an instruction received from the primary vehicle.

Aspect 16: The method of any of aspects 1 through 15, further comprising: determining that, as the result of the change in the formation, the UE is the primary vehicle in the formation.

Aspect 17: The method of aspect 16, wherein determining the distance-based feedback procedure to be used by the UE comprises: determining, based at least in part on the UE being the primary vehicle in the formation, that the distance-based feedback procedure to be used includes activation of distance-based negative acknowledgment feedback for the vehicle grouping while the UE is the primary vehicle.

Aspect 18: The method of any of aspects 16 through 17, further comprising: transmitting, to one or more secondary vehicles in the vehicle grouping, a second indication deactivating distance-based negative acknowledgment feedback at the one or more secondary vehicles after the one or more secondary vehicles have joined the vehicle grouping.

Aspect 19: The method of any of aspects 16 through 18, further comprising: transmitting, to one or more secondary vehicles in the vehicle grouping, a second indication activating distance-based negative acknowledgment feedback at the one or more secondary vehicles before the one or more secondary vehicles leave the vehicle grouping.

Aspect 20: The method of any of aspects 16 through 19, further comprising: transmitting, to a subset of all secondary vehicles in the vehicle grouping, a second indication deactivating distance-based negative acknowledgment feedback at the subset of all secondary vehicles.

Aspect 21: The method of any of aspects 16 through 20, further comprising: transmitting, to one or more secondary vehicles in the vehicle grouping, a second indication via a sidelink message to deactivate or activate distance-based negative acknowledgment feedback.

Aspect 22: The method of aspect 21, wherein the second indication is included within sidelink control information of the sidelink message.

Aspect 23: The method of any of aspects 16 through 22, wherein determining the distance-based feedback procedure to be used by the UE comprises: determining, based at least in part on the UE being the primary vehicle in the formation, that the distance-based feedback procedure to be used includes assisting one or more secondary vehicles in the vehicle grouping via primary vehicle-supported distance-based negative acknowledgment feedback.

Aspect 24: The method of aspect 23, further comprising: transmitting, to the one or more secondary vehicles, one or more sidelink control parameters for the vehicle grouping, the one or more sidelink control parameters including at least one of a negative acknowledgment distance value, a geodesic zone identifier, or a global navigation satellite system coordinate.

Aspect 25: The method of aspect 24, further comprising: determining a length of the vehicle grouping: and determining the one or more sidelink control parameters based at least in part on the length of the vehicle grouping.

Aspect 26: The method of any of aspects 24 through 25, wherein each of the negative acknowledgment distance value, the geodesic zone identifier, or the global navigation satellite system coordinate received from the primary vehicle is representative of the vehicle grouping instead of an individual vehicle.

Aspect 27: An apparatus for wireless communication at a UE, comprising a processor: memory coupled with the processor; and instructions stored in the memory and executable by the processor to cause the apparatus to perform a method of any of aspects 1 through 26.

Aspect 28: An apparatus for wireless communication at a UE, comprising at least one means for performing a method of any of aspects 1 through 26.

Aspect 29: A non-transitory computer-readable medium storing code for wireless communication at a UE, the code comprising instructions executable by a processor to perform a method of any of aspects 1 through 26.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

The term "determine" or "determining" encompasses a wide variety of actions and, therefore, "determining" can include calculating, computing, processing, deriving, investigating, looking up (such as via looking up in a table, a database or another data structure), ascertaining and the like. Also, "determining" can include receiving (such as receiving information), accessing (such as accessing data in a memory) and the like. Also, "determining" can include resolving, selecting, choosing, establishing and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A method for wireless communication at a user equipment (UE), comprising:
receiving an indication of a change in a formation of a vehicle grouping with which the UE is associated, the vehicle grouping comprising a plurality of vehicles moving as a group based at least in part on sidelink communications between members of the group;
determining a distance-based feedback procedure to be used by the UE based at least in part on whether the UE is, as a result of the change in the formation, a primary vehicle in the vehicle grouping or a secondary vehicle that is responsive to one or more primary vehicles in the vehicle grouping; and
operating in accordance with the distance-based feedback procedure.

2. The method of claim 1, further comprising:
determining that, as the result of the change in the formation, the UE is the secondary vehicle in the formation.

3. The method of claim 2, wherein determining the distance-based feedback procedure to be used by the UE comprises:
determining, based at least in part on the UE being the secondary vehicle in the formation, that the distance-based feedback procedure to be used includes deactivation of distance-based negative acknowledgment feedback while the UE is the secondary vehicle.

4. The method of claim 3, further comprising:
deactivating the distance-based negative acknowledgment feedback one or more duty cycles of the UE after the UE joins the vehicle grouping.

5. The method of claim 4, further comprising:
reactivating the distance-based negative acknowledgment feedback upon determining that the UE is no longer the secondary vehicle in the formation.

6. The method of claim 4, further comprising:
reactivating the distance-based negative acknowledgment feedback one or more duty cycles of the UE before the UE leaves the vehicle grouping.

7. The method of claim 2, wherein determining the distance-based feedback procedure to be used by the UE comprises:
receiving a second indication from the one or more primary vehicles in the vehicle grouping that the distance-based feedback procedure to be used by the UE includes deactivation of distance-based negative acknowledgment feedback while the UE is the secondary vehicle.

8. The method of claim 7, further comprising:
receiving a third indication from the one or more primary vehicles in the vehicle grouping that the UE is to reactivate the distance-based negative acknowledgment feedback in connection with the UE no longer being the secondary vehicle in the formation.

9. The method of claim 2, wherein determining the distance-based feedback procedure to be used by the UE comprises:
determining, based at least in part on the UE being the secondary vehicle in the formation, that the distance-based feedback procedure to be used includes primary vehicle-supported distance-based negative acknowledgment feedback while the UE is the secondary vehicle.

10. The method of claim 9, further comprising:
receiving from the primary vehicle, as part of the distance-based feedback procedure, sidelink control information that includes at least one of a negative acknowledgment distance value, a geodesic zone identifier, or a global navigation satellite system coordinate; and
using the at least one of the negative acknowledgment distance value, the geodesic zone identifier, or the global navigation satellite system coordinate as a basis for distance-based negative acknowledgment feedback at the UE.

11. The method of claim 10, wherein using the at least one of the negative acknowledgment distance value, the geodesic zone identifier, or the global navigation satellite system coordinate comprises:
refraining from calculating any of the negative acknowledgment distance value, the geodesic zone identifier, or the global navigation satellite system coordinate while the UE is the secondary vehicle.

12. The method of claim 10, wherein each of the negative acknowledgment distance value, the geodesic zone identifier, or the global navigation satellite system coordinate received from the primary vehicle is representative of the vehicle grouping instead of an individual vehicle.

13. The method of claim 2, further comprising:
using, as the distance-based feedback procedure and based at least in part on the UE being the secondary vehicle in the formation, a primary vehicle-supported distance-based negative acknowledgment feedback while the UE is the secondary vehicle; and transitioning from the primary vehicle-supported distance-based negative acknowledgment feedback to an updated distance-based feedback procedure to be used, wherein the updated distance-based feedback procedure includes deactivation of distance-based negative acknowledgment feedback while the UE is the secondary vehicle.

14. The method of claim 13, wherein the transitioning is based at least in part on an autonomous decision by the UE.

15. The method of claim 13, wherein the transitioning is based at least in part on an instruction received from the primary vehicle.

16. The method of claim 1, further comprising:

determining that, as the result of the change in the formation, the UE is the primary vehicle in the formation.

17. The method of claim 16, wherein determining the distance-based feedback procedure to be used by the UE comprises:

determining, based at least in part on the UE being the primary vehicle in the formation, that the distance-based feedback procedure to be used includes activation of distance-based negative acknowledgment feedback for the vehicle grouping while the UE is the primary vehicle.

18. The method of claim 16, further comprising:

transmitting, to one or more secondary vehicles in the vehicle grouping, a second indication deactivating distance-based negative acknowledgment feedback at the one or more secondary vehicles after the one or more secondary vehicles have joined the vehicle grouping.

19. The method of claim 16, further comprising:

transmitting, to one or more secondary vehicles in the vehicle grouping, a second indication activating distance-based negative acknowledgment feedback at the one or more secondary vehicles before the one or more secondary vehicles leave the vehicle grouping.

20. The method of claim 16, further comprising:

transmitting, to a subset of all secondary vehicles in the vehicle grouping, a second indication deactivating distance-based negative acknowledgment feedback at the subset of all secondary vehicles.

21. The method of claim 16, further comprising:

transmitting, to one or more secondary vehicles in the vehicle grouping, a second indication via a sidelink message to deactivate or activate distance-based negative acknowledgment feedback.

22. The method of claim 21, wherein the second indication is included within sidelink control information of the sidelink message.

23. The method of claim 16, wherein determining the distance-based feedback procedure to be used by the UE comprises:

determining, based at least in part on the UE being the primary vehicle in the formation, that the distance-based feedback procedure to be used includes assisting one or more secondary vehicles in the vehicle grouping via primary vehicle-supported distance-based negative acknowledgment feedback.

24. The method of claim 23, further comprising:

transmitting, to the one or more secondary vehicles, one or more sidelink control parameters for the vehicle grouping, the one or more sidelink control parameters including at least one of a negative acknowledgment distance value, a geodesic zone identifier, or a global navigation satellite system coordinate.

25. The method of claim 24, further comprising:

determining a length of the vehicle grouping; and determining the one or more sidelink control parameters based at least in part on the length of the vehicle grouping.

26. The method of claim 24, wherein each of the negative acknowledgment distance value, the geodesic zone identifier, or the global navigation satellite system coordinate received from the primary vehicle is representative of the vehicle grouping instead of an individual vehicle.

27. An apparatus for wireless communication at a user equipment (UE), comprising:

a processor;

memory coupled with the processor; and instructions stored in the memory and executable by the processor to cause the apparatus to:

receive an indication of a change in a formation of a vehicle grouping with which the UE is associated, the vehicle grouping comprising a plurality of vehicles moving as a group based at least in part on sidelink communications between members of the group;

determine a distance-based feedback procedure to be used by the UE based at least in part on whether the UE is, as a result of the change in the formation, a primary vehicle in the vehicle grouping or a secondary vehicle that is responsive to one or more primary vehicles in the vehicle grouping; and operate in accordance with the distance-based feedback procedure.

28. The apparatus of claim 27, wherein the instructions are further executable by the processor to cause the apparatus to:

determine that, as the result of the change in the formation, the UE is the secondary vehicle in the formation; and determine, based at least in part on the UE being the secondary vehicle in the formation, that the distance-based feedback procedure to be used includes deactivation of distance-based negative acknowledgment feedback while the UE is the secondary vehicle.

29. An apparatus for wireless communication at a user equipment (UE), comprising:

means for receiving an indication of a change in a formation of a vehicle grouping with which the UE is associated, the vehicle grouping comprising a plurality of vehicles moving as a group based at least in part on sidelink communications between members of the group;

means for determining a distance-based feedback procedure to be used by the UE based at least in part on whether the UE is, as a result of the change in the formation, a primary vehicle in the vehicle grouping or a secondary vehicle that is responsive to one or more primary vehicles in the vehicle grouping; and means for operating in accordance with the distance-based feedback procedure.

30. A non-transitory computer-readable medium storing code for wireless communication at a user equipment (UE), the code comprising instructions executable by a processor to:

receive an indication of a change in a formation of a vehicle grouping with which the UE is associated, the vehicle grouping comprising a plurality of vehicles moving as a group based at least in part on sidelink
communications between members of the group;
determine a distance-based feedback procedure to be used
by the UE based at least in part on whether the UE is,
as a result of the change in the formation, a primary 5
vehicle in the vehicle grouping or a secondary vehicle
that is responsive to one or more primary vehicles in the
vehicle grouping; and
operate in accordance with the distance-based feedback
procedure. 10

\* \* \* \* \*